(12) United States Patent
Jung et al.

(10) Patent No.: US 10,631,011 B2
(45) Date of Patent: Apr. 21, 2020

(54) IMAGE PROCESSING METHOD AND APPARATUS FOR PERFORMING SAMPLE ADAPTIVE OFFSET PROCESSING

(71) Applicant: SAMSUNG ELECTRONICS CO., LTD., Suwon-si (KR)

(72) Inventors: Young-beom Jung, Seoul (KR); Ju-won Byun, Hwaseong-si (KR); Hyuk-jae Jang, Suwon-si (KR); Jung-yeop Yang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 149 days.

(21) Appl. No.: 15/814,668

(22) Filed: Nov. 16, 2017

(65) Prior Publication Data

US 2018/0234702 A1    Aug. 16, 2018

(30) Foreign Application Priority Data

Feb. 10, 2017    (KR) .................. 10-2017-0018954

(51) Int. Cl.
| | | |
|---|---|---|
| *H04N 19/82* | (2014.01) | |
| *H04N 19/172* | (2014.01) | |
| *H04N 19/117* | (2014.01) | |
| *H04N 19/132* | (2014.01) | |
| *H04N 19/13* | (2014.01) | |
| *H04N 19/176* | (2014.01) | |
| *H04N 19/157* | (2014.01) | |

(52) U.S. Cl.
CPC .......... *H04N 19/82* (2014.11); *H04N 19/117* (2014.11); *H04N 19/13* (2014.11); *H04N 19/157* (2014.11); *H04N 19/172* (2014.11); *H04N 19/176* (2014.11); *H04N 19/132* (2014.11)

(58) Field of Classification Search
CPC ...... H04N 19/82; H04N 19/117; H04N 19/13; H04N 19/157; H04N 19/172; H04N 19/176; H04N 19/132
USPC .......................................... 375/240.29, 240.2
See application file for complete search history.

(56) References Cited

U.S. PATENT DOCUMENTS

| | | | |
|---|---|---|---|
| 9,204,171 B1* | 12/2015 | Lee | .............. H04N 19/82 |
| 9,445,130 B2 | 9/2016 | Van der Auwera et al. | |
| 2013/0094572 A1* | 4/2013 | Van der Auwera | .... H04N 19/70 375/240.03 |
| 2014/0192869 A1* | 7/2014 | Laroche | ............... H04N 19/176 375/240.12 |
| 2014/0301447 A1* | 10/2014 | Flynn | ..................... H04N 19/30 375/240.03 |
| 2014/0376608 A1 | 12/2014 | Tourapis | |
| 2014/0376619 A1* | 12/2014 | Tourapis | ............. H04N 19/117 375/240.03 |
| 2015/0063438 A1 | 3/2015 | Kim et al. | |
| 2015/0350687 A1 | 12/2015 | Zhai et al. | |

(Continued)

*Primary Examiner* — William C Vaughn, Jr.
*Assistant Examiner* — Jae N Noh
(74) *Attorney, Agent, or Firm* — Sughrue Mion, PLLC

(57) ABSTRACT

An image processing method and apparatus for performing sample adaptive offset (SAO) processing are provided. The image processing method includes: performing, based on a largest coding unit (LCU) and a coding unit (CU), an encoding operation on a frame image; setting a maximum offset having a value adjusted according to a maximum transformation size in the encoding operation; and calculating, based on the set maximum offset, a sample adaptive offset (SAO) parameter for use in SAO compensation.

19 Claims, 27 Drawing Sheets

(56) References Cited

U.S. PATENT DOCUMENTS

2015/0373362 A1 12/2015 Pang et al.
2016/0156915 A1 6/2016 Choi
2016/0212438 A1 7/2016 Andersson et al.

* cited by examiner

FIG. 5A

| Max Transform Size | Max offset |
|---|---|
| MTS < Size_Ref | Max offset > Value_Ref |
| MTS = Size_Ref | Max offset = Value_Ref |
| MTS > Size_Ref | Max offset < Value_Ref |

FIG. 5B

| Max Transform Size | Bitdepth | Max offset |
|---|---|---|
| MTS < Size_Ref | BD > Num_Ref | Max offset > Value_Ref |
| MTS = Size_Ref | BD = Num_Ref | Max offset = Value_Ref |
| MTS > Size_Ref | BD < Num_Ref | Max offset < Value_Ref |

FIG. 6A

| EO CLASS = 0 | EO CLASS = 1 | EO CLASS = 2 | EO CLASS = 3 |
|---|---|---|---|
| HORIZONTAL | VERTICAL | 135° DIAGONAL | 45° DIAGONAL |
| X1 X0 X2 | X3<br>X0<br>X4 | X5<br>X0<br>X8 | X6<br>X0<br>X7 |

FIG. 6B

| CATEGORY | CONDITION |
|---|---|
| 1 | Xc < Xa && Xc < Xb |
| 2 | (Xc < Xa && Xc == Xb) \|\| (Xc == Xa && Xc < Xb) |
| 3 | (Xc > Xa && Xc == Xb) \|\| (Xc == Xa && Xc > Xb) |
| 4 | Xc > Xa && Xc > Xb |
| 0 | IF CONDITIONS FOR CATEGORIES 1, 2, 3 AND 4 ARE NOT SATISFIED |

FIG. 11

| Tx MAX | 32 | 16 | 8 | 4 |
|---|---|---|---|---|
| LOG2(Tx MAX) | 5 | 4 | 3 | 2 |
| Max(SaoOffsetAbs) | 7 | 15 | 31 | 63 |

FIG. 13A $$\text{Max}(\text{Err}_s)|_{\text{Tx}_{MAX}=32} \cong \sqrt{\frac{228^2}{\text{Tx}_{MAX}^2}} = \frac{228}{32} = 7.125$$

$$\text{Max}(\text{Err}_s)|_{\text{Tx}_{MAX}=16} \cong \sqrt{\frac{228^2}{\text{Tx}_{MAX}^2}} = \frac{228}{16} = 14.25$$

$$\text{Max}(\text{Err}_s)|_{\text{Tx}_{MAX}=8} \cong \sqrt{\frac{228^2}{\text{Tx}_{MAX}^2}} = \frac{228}{8} = 28.5$$

$$\text{Max}(\text{Err}_s)|_{\text{Tx}_{MAX}=4} \cong \sqrt{\frac{228^2}{\text{Tx}_{MAX}^2}} = \frac{228}{4} = 57$$

FIG. 13B

| Tx MAX | 32 | 16 | 8 | 4 |
|---|---|---|---|---|
| Max(SaoOffsetAbs) | 7 | 14 | 28 | 57 |

FIG. 14

| |
|---|
| sao( rx, ry ){ |
|     if( SaoTypeIdx[ cIdx ][ rx ][ ry ] != 0 ) { |
|     for( i = 0; i < 4; i++ ) |
|     sao_offset_abs[ cIdx ][ rx ][ ry ][ i ] |
|     if( SaoTypeIdx[ cIdx ][ rx ][ ry ] == 1 ) { |
|     for( i = 0; i < 4; i++ ) |
|     if( sao_offset_abs[ cIdx ][ rx ][ ry ][ i ] != 0 ) |
|     sao_offset_sign[ cIdx ][ rx ][ ry ][ i ] |
|     sao_band_position[ cIdx ][ rx ][ ry ] |
|     } else { |
|     if( cIdx == 0 ) |
|     sao_eo_class_luma |
|     if( cIdx == 1 ) |
|     sao_eo_class_chroma |
|     } |
|     } |
|     } |
| } |

IMAGE PROCESSING METHOD AND APPARATUS FOR PERFORMING SAMPLE ADAPTIVE OFFSET PROCESSING

CROSS-REFERENCE TO RELATED APPLICATION

This application claims the benefit of Korean Patent Application No. 10-2017-0018954, filed on Feb. 10, 2017, in the Korean Intellectual Property Office, the disclosure of which is incorporated herein in its entirety by reference.

BACKGROUND

The inventive concept relates to an image processing apparatus, and more particularly, to an image processing method and apparatus for performing sample adaptive offset (SAO) processing.

As various hardware for reproducing and storing high resolution or high quality video content has been developed and introduced in the market, a need for a video codec for effectively encoding or decoding high resolution or high quality video content has increased. In the case of a video codec of the related art, a video is encoded by using a limited encoding method based on a coding unit having a predetermined size.

In particular, a method of adjusting a pixel value of a reconstructed image by as much as an SAO may be used during operations of encoding and decoding video in order to minimize an error between an original image and a reconstructed image. However, in the limited encoding method, the compensation performance of using the SAO may be restricted.

SUMMARY

The inventive concept provides an image processing method and apparatus, whereby the sample adaptive offset (SAO) compensation performance may be improved and an amount of information required for an SAO parameter may be decreased.

According to an aspect of the inventive concept, there is provided an image processing method including: performing, based on a largest coding unit (LCU) and a coding unit (CU), an encoding operation on a frame image; setting a maximum offset having a value adjusted according to a maximum transformation size in the encoding operation; and calculating, based on the set maximum offset, a sample adaptive offset (SAO) parameter for use in SAO compensation.

According to another aspect of the inventive concept, there is provided an image processing method including: performing, based on a first maximum transformation size, an encoding operation on a first image; setting a first maximum offset corresponding to the first maximum transformation size; performing sample adaptive offset (SAO) compensation on the first image by calculating an offset value that is less than or equal to the set first maximum offset; performing, based on a second maximum transformation size, an encoding operation on a second image; and setting a second maximum offset corresponding to the second maximum transformation size, wherein values of the first maximum offset and the second maximum offset are different from each other.

According to another aspect of the inventive concept, there is provided an image processing apparatus including: a transformation and quantization unit configured to perform, based on a processing unit less than or equal to a maximum transformation size, a transformation and quantization operation on an input image; and a sample adaptive offset (SAO) encoder configured to receive a reconstructed image generated via an inverse quantization and inverse transformation process with respect to the transformed and quantized input image and to perform SAO compensation on the reconstructed image by using a maximum offset having a value adjusted according to a change of the maximum transformation size.

In yet another aspect, there is an image processing method including: performing, based on a largest coding unit (LCU) and a coding unit (CU), an encoding operation on a frame image; setting a maximum offset having a value that is adjusted according to a maximum transformation size in the encoding operation; and calculating, based on the maximum offset, a sample adaptive offset (SAO) parameter for use in sample adaptive offset (SAO) compensation.

In one aspect, there is an image processing method including: performing, based on a first maximum transformation size, a first encoding operation on a first image; setting a first maximum offset corresponding to the first maximum transformation size; performing a sample adaptive offset (SAO) compensation on the first image by calculating a first offset value that is less than or equal to the first maximum offset; performing, based on a second maximum transformation size, a second encoding operation on a second image; and setting a second maximum offset corresponding to the second maximum transformation size, wherein a first value of the first maximum offset and a second value of the second maximum offset are different.

In another aspect, there is an image processing apparatus including: a transformation and quantization unit configured to perform, based on a processing unit less than or equal to a maximum transformation size, a transformation operation and a quantization operation on an input image; and a sample adaptive offset (SAO) encoder configured to receive a reconstructed image generated via an inverse quantization process and an inverse transformation process with respect to the input image on which the transformation operation and the quantization operation has been performed, and to perform sample adaptive offset (SAO) compensation on the reconstructed image by using a maximum offset having a value adjusted according to a change of the maximum transformation size.

BRIEF DESCRIPTION OF THE DRAWINGS

Exemplary embodiments of the inventive concept will be more clearly understood from the following detailed description taken in conjunction with the accompanying drawings in which:

FIGS. 5A and 5B each are tables showing a setting example of a maximum offset according to an example embodiment of the inventive concept;

FIGS. 6A to 6C are diagrams of a method of classifying pixels according to an edge type in an SAO encoding operation according to an example embodiment of the inventive concept;

FIGS. 10 and 11 are diagrams of an example of setting a maximum offset according to an example embodiment of the inventive concept;

FIGS. 12, 13A, and 13B are diagrams of another example of setting a maximum offset according to an example embodiment of the inventive concept;

FIG. 14 is a diagram of an example of a syntax structure having an SAO parameter defined according to an example embodiment of the inventive concept;

DETAILED DESCRIPTION OF THE EXEMPLARY EMBODIMENTS

Hereinafter, example embodiments of the inventive concept will be described in detail with reference to the accompanying drawings.

Figure 1:
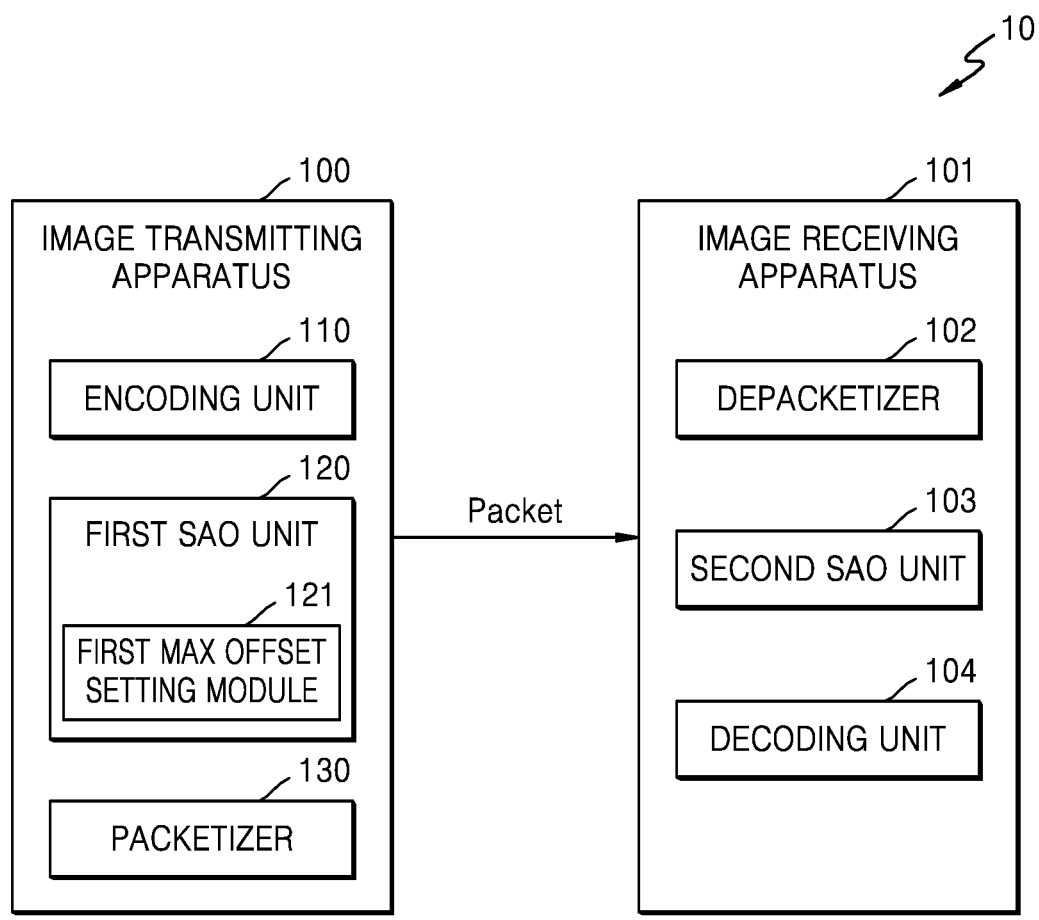
FIG. 1 is a block diagram of an image processing system including an image processing apparatus according to an example embodiment of the inventive concept.

FIG. 1 is a block diagram of an image processing system 10 including an image processing apparatus according to an example embodiment of the inventive concept. The image processing system 10 shown in FIG. 1 may include an image transmitting apparatus 100 and an image receiving apparatus 101 as an image processing apparatus according to one or more example embodiments of the inventive concept. Alternatively, the image processing apparatus according to one or more embodiments of the inventive concept may have both a function of transmitting an image and a function of receiving an image, and accordingly, the image processing apparatus may correspond to the image processing system 10.

The image processing system 10 may be of various types. For example, the image transmitting apparatus 100 and the image receiving apparatus 101 may transmit and receive information including an image to or from each other via a wireless or wired network in the image processing system 10. If the image processing system 10 is a wireless communication system, the image transmitting apparatus 100 and the image receiving apparatus 101 may be terminal devices, such as smartphones, which encode an image and transmit the image to a base station or decode an image received from a base station, respectively. Alternatively, the image processing system 10 may be a network system such as an Internet broadcasting system or an Internet Protocol Television (IPTV) system.

The image transmitting apparatus 100 may perform an encoding operation according to various video standards such as MPEG, H.264/AVC, VP8, and High Efficiency Video Coding (HEVC). An image encoding operation may be performed with respect to an image of a predetermined unit (for example, a frame image), and each frame image may be compressed via inter prediction or may be compressed via intra prediction. When compression is performed via intra prediction, a current frame image may be compressed without referring to a previous frame image. Also, when compression is performed via inter prediction, a current frame image may be compressed by referring to one or more previous frame images (for example, reconstructed images). Although embodiments of the inventive concept will be described hereinafter with reference to the video standard of HEVC, embodiments of the inventive concept may also apply to various video standards, such as H.264, described above.

According to an example embodiment of the inventive concept, the image transmitting apparatus 100 may include an encoding unit 110, a first sample adaptive offset unit 120 (a first SAO unit 120), and a packetizer 130. Also, the image receiving apparatus 101 may include a depacketizer 102, an second SAO unit 103, and a decoding unit 104. Each of the first SAO unit 120 of the image transmitting apparatus 100 and the second SAO unit 103 of the image receiving apparatus 101 may perform an SAO encoding operation and/or an SAO decoding operation. For example, since the image transmitting apparatus 100 may perform SAO encoding for transmitting an image, the first SAO unit 120 may be referred to as an SAO encoder. Also, since the image receiving apparatus 101 may perform SAO decoding for receiving an image, the second SAO unit 103 may be referred to as an SAO decoder. Hereinafter, an SAO unit may be referred to as an SAO encoder or an SAO decoder.

The encoding unit 110 may perform an encoding operation based on a largest coding unit (LCU). For example, the LCU may be defined with respect to a frame image, and the LCU may be referred to as a macro block according to various video standards. For example, the LCU may have a size having a number of pixels, e.g., a size of 64*64 pixels.

When encoding is performed, the LCU may be split into a plurality of coding units (CUs). The LCU or a CU may correspond to a coding unit, and the encoding unit 110 may perform a frequency transformation and quantization operation regarding pixel values according to the coding unit. Accordingly, a unit for performing the frequency transformation and quantization operation may correspond to the CU, and a maximum value (for example, a maximum transformation size) of the unit for performing the frequency transformation and quantization operation may correspond to the LCU.

Also, the encoding unit 110 may generate a reconstructed image by performing a decoding operation via inverse quantization, e.g., inverse quantization process, inverse transformation, e.g., inverse transformation process, etc. with respect to a frame image that is encoded to perform inter prediction. Also, SAO encoding in which a value of a reconstructed pixel is adjusted (or compensated) by as much as an SAO may be performed in order to minimize an error between an original image and the reconstructed image. The first SAO unit 120 may calculate an offset value corresponding to each of the pixels included in the LCU or the CU, and may perform sample adaptive offset (SAO) compensation by adding up a pixel value of the reconstructed image to a corresponding offset value. For example, pixels included in the CU may be classified into a plurality of blocks (for example, SAO blocks) according to a predetermined condition, and an offset value may be calculated with respect to each classified SAO block. Although the encoding unit 110 and the first SAO unit 120 are shown as separate elements in FIG. 1, this is only for convenience of description, and the first SAO unit 120 may be included in the encoding unit 110. Also, the first SAO unit 120 corresponds to an element that performs various operations regarding SAO compensation and may be referred to as an SAO processor.

The packetizer 130 may transmit data of a frame image encoded as described above in the form of a bitstream to the image receiving apparatus 101. The packetizer 130 may perform a packetization operation regarding encoded data, and may transmit a packet to the image receiving apparatus 101 via a network. The packet may include encoded SAO parameters related to an SAO encoding operation, in addition to the encoded data.

The image receiving apparatus 101 may receive the packet, and the depacketizer 102 may extract an actual information part (for example, payload) from the packet received via the network. The decoding unit 104 may reconstruct a frame image in a reconstructing, via a decoding operation regarding received information, and the second SAO unit 103 may adjust a pixel value of a reconstructed image by as much as an offset value to minimize an error between an original image and the reconstructed image. When the image receiving apparatus 101 has a function of transmitting an image, the second SAO unit 103 of the image receiving apparatus 101 may be implemented substantially same as or in a similar way to the first SAO unit 120 of the image transmitting apparatus 100.

A maximum offset may be set for an SAO encoding operation, and an offset value applied to each pixel may be equal or less than the set maximum offset, i.e., there is an allocating of an offset value less than or equal to the maximum offset. According to an embodiment, the first SAO unit 120 may include a first maximum offset setting module 121, and the first maximum offset setting module 121 may adaptively adjust the maximum offset with respect to a predetermined image processing unit. According to an embodiment, the set maximum offset may be generated as a sample adaptive offset (SAO) parameter related to SAO encoding, and the maximum offset may be encoded and transmitted to the image receiving apparatus 101.

For example, the first maximum offset setting module 121 may adjust a maximum offset based on a maximum transformation size as a unit for performing the frequency transformation and quantization operation described above. For example, as the maximum transformation size increases, the first maximum offset setting module 121 may decrease the maximum offset. On the other hand, as the maximum transformation size decreases, the first maximum offset setting module 121 may increase the maximum offset. That is, as the maximum transformation size decreases, a signal loss during the frequency transformation and quantization operation increases, and the first maximum offset setting module 121 may increase the maximum offset to improve compensation accuracy of the SAO encoding. In this regard, when the maximum transformation size corresponds to the LCU, the first maximum offset setting module 121 may adjust the maximum offset based on the LCU.

According to an embodiment, a maximum transformation size having a predetermined reference size may be defined. For example, the maximum transformation size may correspond to 32*32 pixels, and a maximum offset having a predetermined value may be defined accordingly. The first maximum offset setting module 121 may compare the maximum transformation size with the reference size, and may decrease the maximum offset when the maximum transformation size is greater than the reference size, or may increase the maximum offset when the maximum transformation size is less than the reference size.

A method of setting a maximum offset may be implemented in various manners. For example, a maximum transformation size may be defined with respect to one frame image, and a maximum offset set based on the maximum transformation size may be commonly applied to the one frame image. That is, SAO compensation may be performed according to the set maximum offset with respect to pixels of one frame image.

According to another exemplary embodiment, a maximum transformation size may be defined with respect to a plurality of frame images, and a maximum offset set based on the maximum transformation size may be commonly applied to the plurality of frame images. According to another exemplary embodiment, one frame image may be split into a plurality of regions (for example, slices, first region, second region, etc.), and a different maximum transformation size may be defined with respect to each region. In this regard, a plurality of maximum offsets may be set with respect to the one frame image, and a maximum offset having a different value may be set with respect to each region. According to another exemplary embodiment, one frame image may be split into a plurality of CUs, and a maximum offset may be set with respect to each CU. That is, each CU may correspond to a transformation size for performing the frequency transformation and quantization operation described above, and a different maximum offset may be set with respect to each CU.

In view of the above exemplary embodiments, there is a method of performing, based on a first maximum transformation size, a first encoding operation on a first image. There is a setting a first maximum offset corresponding to the first maximum transformation size. A sample adaptive offset (sao) compensation is performed on the first image by calculating a first offset value that is less than or equal to the first maximum offset and further, based on a second maximum transformation size, a second encoding operation is performed on a second image. A second maximum offset is set corresponding to the second maximum transformation size, wherein a first value of the first maximum offset and a second value of the second maximum offset are different. The first image may be in a first region of a first frame, and the second image may be in a second region of the first frame. Further, the first maximum transformation size is corresponding to a first maximum processing unit for performing a first transformation operation and a first quantization operation on the first image, and the second maximum transformation size is corresponding to a second maximum processing unit for performing a second transformation and quantization operation on the second image. Furthermore, the sao compensation is performed on the second image by calculating a second offset value that is less than or equal to the second maximum offset, wherein, when the second maximum transformation size is less than the first maximum transformation size, a second maximum value of the second offset value applied to the second image is greater than a first maximum value of the first offset value applied to the first image.

When a unit for setting a maximum offset is changed as described above, a transmission cycle of various SAO parameters related to the SAO encoding may also be changed. For example, when various SAO parameters related to the SAO encoding are set with respect to one frame image, the SAO parameters may be encoded with respect to each frame image and be transmitted to the image receiving apparatus 101. On the other hand, when SAO parameters related to the SAO encoding are set with respect to each region in one frame image, the SAO parameters may be encoded with respect to each region and be transmitted to the image receiving apparatus 101.

According to an exemplary embodiment, the first maximum offset setting module 121 may determine a maximum offset more based on a bit depth indicating the number of bits included in each pixel. For example, under the same maximum transformation size, the first maximum offset setting module 121 may increase the maximum offset as the bit depth increases, i.e., as the bit depth of pixels increases. On the other hand, the first maximum offset setting module 121 may decrease the maximum offset as the bit depth decreases. That is, the first maximum offset setting module 121 may set the maximum offset based on the maximum transformation size and a combination of the number of bits of the bit depth.

According to the exemplary embodiment described above, the maximum offset applied to SAO compensation may be adaptively adjusted, and accordingly, the picture quality of a reconstructed image may be improved and the compressive performance of signaling between the image transmitting apparatus 100 and the image receiving apparatus 101 may also be improved. For example, an error between an original image and a reconstructed image may be decreased by adaptively increasing the maximum offset, and thus, the picture quality of the reconstructed image may be improved. Also, the amount of information during an encoding (for example, entropy encoding) process regarding an SAO parameter may be decreased by adaptively decreasing the maximum offset, and accordingly, the compressive performance of signaling between the image transmitting apparatus 100 and the image receiving apparatus 101 may be improved.

Figure 2:
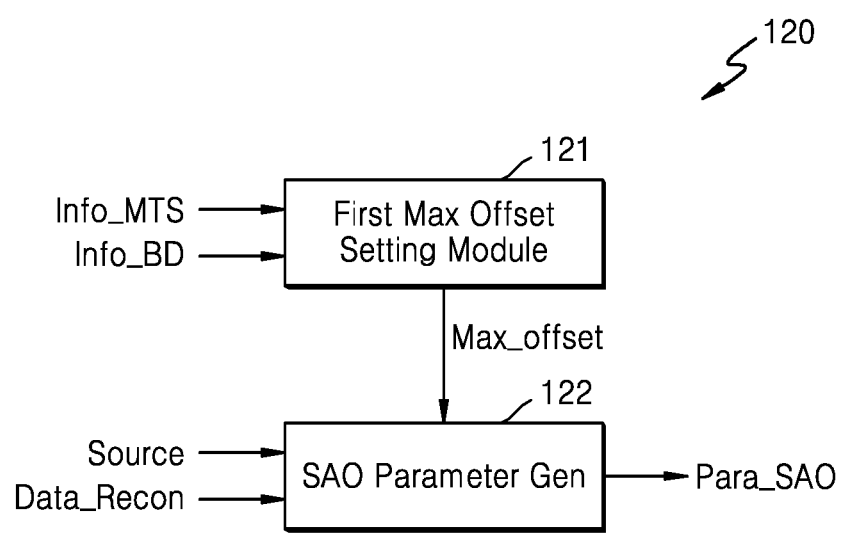
FIGS. 2 and 3 each are block diagrams of an implementation example of a sample adaptive offset (SAO) unit shown in FIG. 1 according to example embodiments of the inventive concept.
Figure 3:
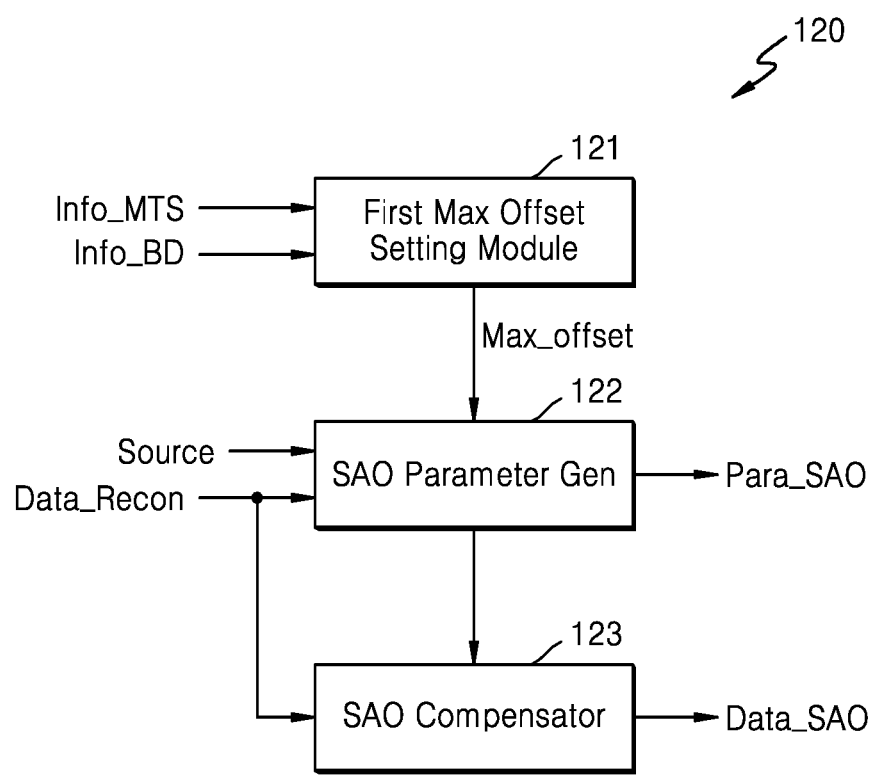

FIGS. 2 and 3 each are block diagrams of an implementation example of the first SAO unit 120 shown in FIG. 1.

Referring to FIG. 2, the first SAO unit 120 may include the first maximum offset setting module 121 and an SAO parameter generator 122. The first maximum offset setting module 121 may set a maximum offset in various ways according to the previous exemplary embodiment, and for example, the first maximum offset setting module 121 may set a maximum offset Max_offset by using first information Info_MTS indicating a maximum transformation size (MTS), e.g., information related to the maximum transformation size. Alternatively, the first maximum offset setting module 121 may set the maximum offset Max_offset by further using second information Info_BD indicating a bit depth, e.g., information related to bit depth of pixels of the input image, in addition to the first information Info_MTS.

The SAO parameter generator 122 may generate various SAO parameters Para_SAO for use in SAO compensation based on the maximum offset Max_offset. For example, the SAO parameter generator 122 may calculate various SAO parameters by using an original image Source and a reconstructed image Data_Recon. Also, the various SAO parameters may include information such as the set maximum offset Max_offset (e.g., a parameter indicating an offset value that is to be used in SAO compensation), an offset absolute value that is to be applied to each pixel (or SAO block), an offset sign, and a pixel (or SAO block) that SAO compensation is to be selectively applied to. The SAO parameters Para_SAO from the SAO parameter generator 122 may be used to generate a reconstructed image in an image transmitting apparatus. Also, the SAO parameters Para_SAO may be encoded and transmitted to an image receiving apparatus.

Referring to FIG. 3, the first SAO unit 120 may include the first maximum offset setting module 121, the SAO parameter generator 122, and an SAO compensator 123. In the same way as or a similar way to the previous exemplary embodiment, the first maximum offset setting module 121 may set a maximum offset Max_offset by using first information Info_MTS indicating a maximum transformation size and/or second information Info_BD indicating a bit depth (e.g., at least one from among information related to the maximum transformation size and information related to a bit depth of pixels of the input image, and at least one from among one information related to the maximum transformation size and another information related to the bit depth of pixels of the input image), and the SAO parameter generator 122 may generate an SAO parameter Para_SAO for use in SAO compensation based on the set maximum offset Max_offset. Also, the SAO compensator 123 may receive data Data_Recon of a reconstructed image and the SAO parameter Para_SAO, may perform an SAO compensation operation, and may output SAO compensated data Data_SAO.

Figure 4:
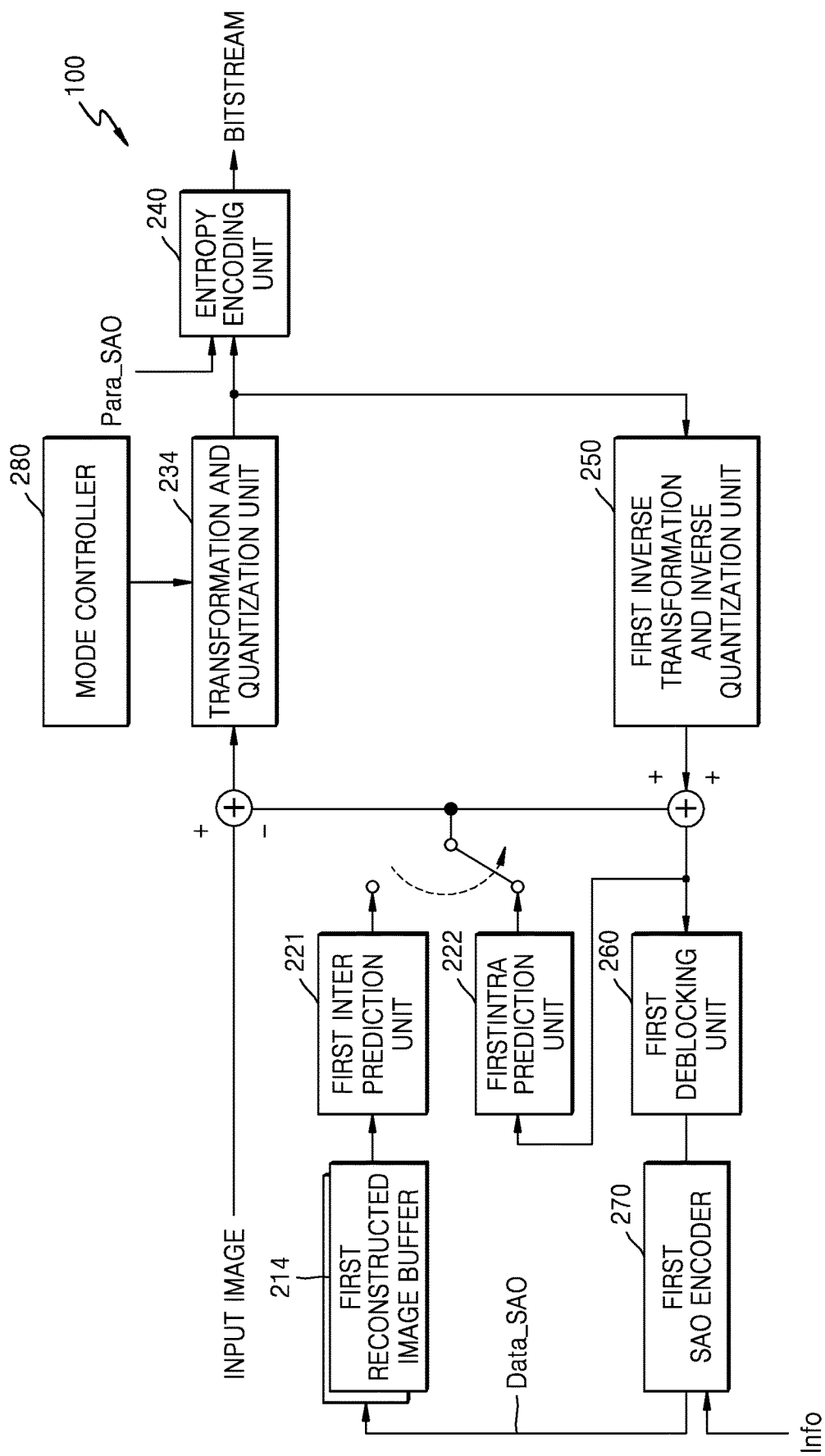
FIG. 4 is a block diagram of detailed configurations of an image transmitting apparatus according to an example embodiment of the inventive concept.

FIG. 4 is a block diagram of detailed configurations of the image transmitting apparatus 100 according to an example embodiment of the inventive concept.

Referring to FIG. 4, the image transmitting apparatus 100 may include a first reconstructed image buffer 214, a first inter prediction unit 221, a first intra prediction unit 222, a transformation and quantization unit 234, an entropy encoding unit 240 (e.g., an entropy encoder), and a first inverse transformation and inverse quantization unit 250. Also, the image transmitting apparatus 100 may further include a first deblocking unit 260, an SAO unit (or first SAO encoder 270), and a mode controller 280. The structure shown in FIG. 4 is merely an exemplary embodiment, and the image transmitting apparatus 100 may further include other various functional blocks that are not shown in FIG. 4.

The first intra prediction unit 222 may perform intra prediction on coding units in an intra mode, from among a current frame image. Also, the first inter prediction unit 221 performs inter prediction on coding units in an inter mode by using the current frame image (for example, an input image) and a reference image obtained from the first reconstructed image buffer 214 according to prediction units. Although not shown in FIG. 4, the image transmitting apparatus 100 may further include a functional block that performs motion estimation and compensation by using the input image and the reference image.

Data (for example, differential data) outputted from the first inter prediction unit 221 and the first intra prediction unit 222 may be outputted as a quantized transformation coefficient via the transformation and quantization unit 234. The transformation and quantization unit 234 may transform input data of a spatial domain into data of a frequency domain. Frequency transformation may be, for example, discrete cosine transform (DCT) or discrete sine transform (DST). Also, the transformation and quantization unit 234 may perform a quantization operation using a quantization parameter (QP), e.g., quantization parameter information, with respect to transformed data of a frequency domain. For example, the QP may be an integer having a predetermined fixed value. Alternatively, in an example embodiment, the transformation and quantization unit 234 may perform adaptive frequency weighting quantization. The entropy encoding unit 240 may perform entropy encoding regarding the quantized transformation coefficient and may transmit a bitstream to an image receiving apparatus 101.

The quantized transformation coefficient may be provided to the first inverse transformation and inverse quantization unit 250 in order to generate a reconstructed image. The quantized transformation coefficient may be restored to data of a spatial domain by the first inverse transformation and inverse quantization unit 250, and deblocking filtering may be performed on reconstructed data of a spatial domain by the first deblocking unit 260.

The first SAO encoder 270 may perform an SAO compensation operation according to the previous exemplary embodiment regarding a reconstructed image on which deblocking filtering has been performed. For example, the first SAO encoder 270 may set or adjust a maximum offset based on various pieces of information Info including a maximum transformation size, and may perform SAO compensation by using an offset value calculated with respect to each pixel of the reconstructed image based on the set maximum offset.

The first SAO encoder 270 may output data Data_SAO on which SAO compensation has been performed, and the data Data_SAO from the first SAO encoder 270 may be stored in the first reconstructed image buffer 214 as a reference image. Also, the first SAO encoder 270 may generate various SAO parameters Para_SAO related to SAO compensation, and the SAO parameters Para_SAO from the first SAO encoder 270 may be provided to the entropy encoding unit 240 and thus may be entropy encoded and included in a bitstream. The bitstream may be, for example, a network abstraction layer (NAL) unit stream capable of representing video data or a bit string in the form of a byte stream.

According to an exemplary embodiment, the first SAO encoder 270 may perform SAO compensation on each color component. For example, for YCrCb color image, SAO compensation may be performed on each of the luma component (Y component) and the first and second chroma components (Cr, Cb components). For example, the first SAO encoder 270 may determine whether to perform SAO compensation on the luma component of the current frame image. Also, the first SAO encoder 270 may determine whether to perform SAO compensation on the first chroma component (Cr) and the second chroma component (Cb) of the current frame image and may determine in the same way. That is, if SAO compensation is performed on the first chroma component (Cr), SAO compensation may be performed on the second chroma component (Cb), too. If SAO compensation is not performed on the first chroma component (Cr), SAO compensation may not be performed on the second chroma component (Cb), either.

The mode controller 280 may control an operation mode of the transformation and quantization unit 234, and for example, may adjust a processing unit (for example, a transformation size) of the transformation and quantization unit 234. The mode controller 280 may output various pieces of control information for controlling an operation of the transformation and quantization unit 234, and for example, information related to a maximum processing unit, i.e., a maximum transformation size, may correspond to control information from the mode controller 280 or may be generated from control information from the mode controller 280. Also, various pieces of control information from the mode controller 280 may be entropy encoded and included in a bitstream.

According to an exemplary embodiment, format of SAO parameters transmitted to an image receiving apparatus may be changed according to a set maximum offset. For example, when the maximum offset has a large value, a bit representing method for indicating an offset value that has a value within the maximum offset may be defined differently from a case in which the maximum offset has a small value. For example, when the maximum offset having a large value is set, a bit number indicating an offset value may correspond to a relatively larger number, whereas when the maximum offset having a small value is set, a bit number indicating an offset value may correspond to a relatively smaller number. An image transmitting apparatus may include a maximum offset and an offset value in SAO parameters, and an image receiving apparatus may determine the offset value included in the SAO parameters by referring to received information regarding the maximum offset. Also, when the maximum offset having a small value is set, the amount of information in signaling related to an SAO operation in the image transmitting apparatus and the image receiving apparatus may be decreased.

FIGS. 5A and 5B each are tables showing a setting example of a maximum offset according to an exemplary embodiment of the inventive concept.

As in the previous exemplary embodiment, an SAO encoder may set a maximum offset with respect to each frame image, each LCU, or each CU. When a maximum offset is set with respect to each CU, the maximum offset may be set based on a transformation size corresponding to each CU. That is, although a case in which the SAO encoder sets a maximum offset based on a maximum transformation size is illustrated in FIGS. 5A and 5B, exemplary embodiments of the inventive concept are not limited thereto.

Referring to FIG. 5A, a value of the maximum offset may increase or decrease according to a maximum transformation size MTS. For example, when the maximum transformation size MTS has a predetermined reference size Size_Ref, a reference value Value_Ref of the maximum offset may be defined accordingly. For example, when the reference size Size_Ref corresponds to a size of 32*32 pixels, the reference value Value_Ref corresponding to 7 may be defined accordingly. If the maximum offset is set as 7 with respect to a certain LCU, SAO compensation may be performed by adding or subtracting an offset value to the maximum of 7 with respect to pixels included in the LCU or CUs split therefrom.

On the other hand, when the maximum transformation size MTS is less than the reference size Size_Ref (for example, 16*16 or 8*8 pixels), a maximum offset Max offset may be set greater than the reference value Value_Ref. For example, the maximum offset Max offset may be adjusted as various steps such as 15, 31, and 63 according to the maximum transformation size MTS. On the other hand, when the maximum transformation size MTS is greater than the reference size Size_Ref (for example, 32*64 or 64*64 pixels), the maximum offset Max offset may be set less than the reference value Value_Ref.

Although it is illustrated in the table of FIG. 5A that the maximum transformation size MTS corresponding to 32*32 pixels corresponds to the reference size Size_Ref, exemplary embodiments of the inventive concept are not limited thereto. For example, in HEVC video standard, the LCU may vary, and pixels of various sizes such as 64*64 and 32*64 may be defined as the reference size Size_Ref.

FIG. 5B illustrates a case in which an SAO encoder adjusts or sets a maximum offset Max offset based on a maximum transformation size MTS and a bit depth BD. As in the exemplary embodiment of FIG. 5A, under a condition in which the bit depth BD is identical, the maximum offset Max offset may increase when the maximum transformation size MTS decreases, and the maximum offset Max offset may decrease when the maximum transformation size MTS increases.

When a pixel has a large bit depth BD, the number of bits included in each pixel increases, and a range of an offset value for which the pixel has to be compensated via SAO compensation needs to increase as a range of each pixel value increases. Accordingly, under a condition in which the maximum transformation size MTS is identical, the maximum offset Max offset may increase when the bit depth BD is large, and the maximum offset Max offset may decrease when the bit depth BD is small.

Also, a predetermined reference bit number Num_Ref may be defined with respect to the bit depth BD. According to the references described above, when the maximum transformation size MTS is greater than the reference size Size_Ref, or the bit depth BD is less than the reference bit number Num_Ref, the maximum offset Max offset may decrease. On the other hand, when the maximum transformation size MTS is less than the reference size Size_Ref, or the bit depth BD is greater than the reference bit number Num_Ref, the maximum offset Max offset may increase. In addition, there may be various conditions such as cases in which both of the maximum transformation size MTS and the bit depth BD are greater or less than the references, and in this regard, the maximum offset Max offset may be variously adjusted via a functional operation, table information analysis, or the like in the SAO encoder.

Figure 6C:
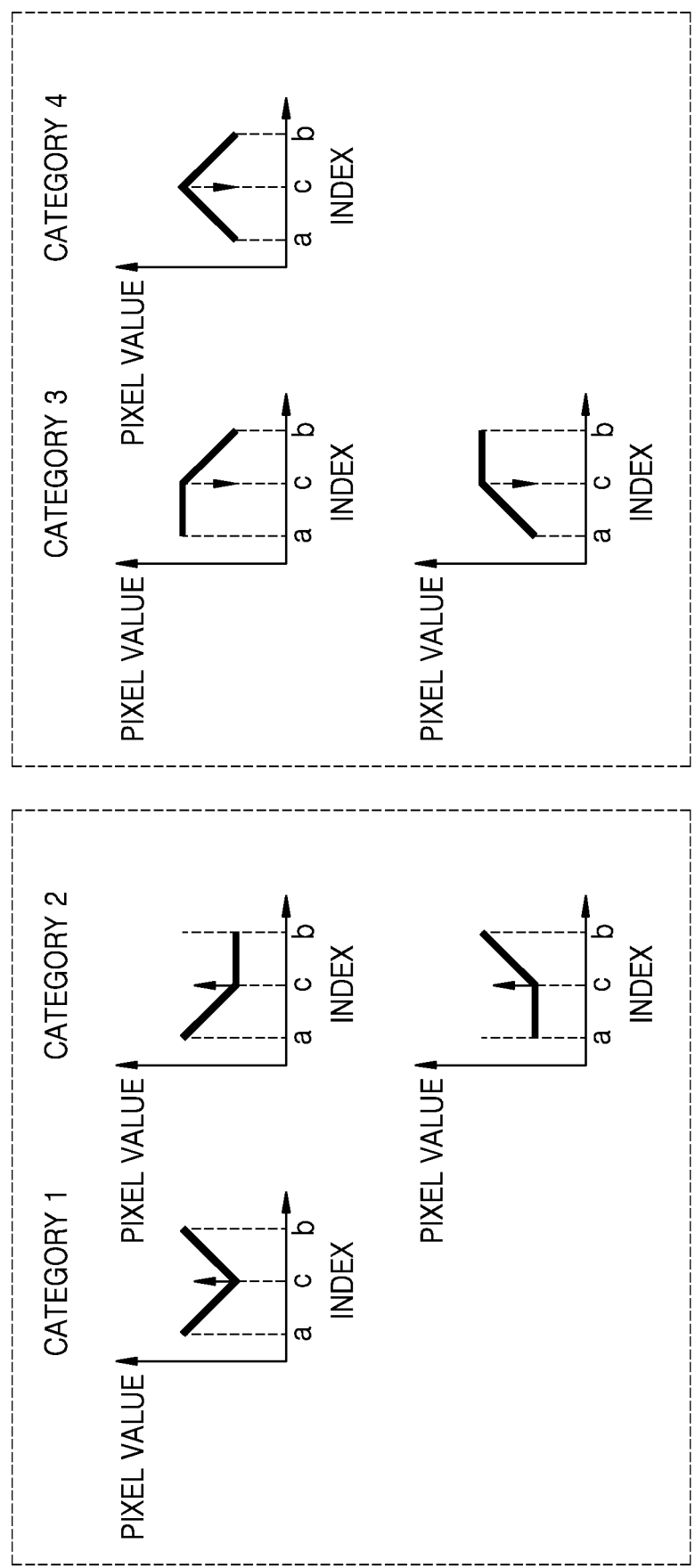

FIGS. 6A to 6C are diagrams of a method of classifying pixels according to an edge type in an SAO encoding operation. FIG. 6A shows classes of edge types, and FIGS. 6B and 6C show categories of edge types.

According to the technique of SAO encoding, in classifying pixels, pixels may be classified according to an edge type constituted by reconstructed pixels (or samples), or pixels may be classified according to a band type of reconstructed pixels. According to an example embodiment, whether pixels are classified according to the edge type or the band type may be defined based on an SAO type.

An exemplary embodiment in which pixels are classified according to an edge type will be described first with reference to FIGS. 6A to 6C.

FIG. 6A shows classes of edge types. When an offset of an edge type is determined with respect to an LCU, an edge class of each reconstructed pixel included in the LCU may be determined. That is, edge classes of current reconstructed pixels may be defined by comparing pixels values of a current reconstructed pixel and adjacent pixels with each other.

Indexes of edge classes may be sequentially allocated as 0, 1, 2, and 3. The higher frequency of occurrence of an edge type, the smaller index of the edge type.

An edge class may indicate a direction of one-dimensional edges formed between a current reconstructed pixel X0 and two adjacent pixels. The edge class having the index 0 may indicate a case in which edges are formed between the current reconstructed pixel X0 and two horizontally adjacent pixels X1 and X2. The edge class having the index 1 may indicate a case in which edges are formed between the current reconstructed pixel X0 and two vertically adjacent pixels X3 and X4. The edge class having the index 2 may indicate a case in which edges are formed between the current reconstructed pixel X0 and two 135°-diagonally adjacent pixels X5 and X8. The edge class having the index 3 may indicate a case in which edges are formed between the current reconstructed pixel X0 and two 45°-diagonally adjacent pixels X6 and X7. Accordingly, by analyzing edge directions of reconstructed pixels included in a current LCU, an edge class of the current LCU may be determined.

With respect to each edge class, categories may be classified according to an edge shape of a current pixel. An example of categories according to edge shapes will now be described with reference to FIGS. 6B and 6C.

FIGS. 6B and 6C show categories of edge types according to an example embodiment. In more detail, FIG. 6B illustrates conditions for determining categories of edges, and FIG. 6C illustrates graphs of edge shapes between a reconstructed pixel and adjacent pixels and their pixel values c, a, and b. An edge category may indicate whether a current pixel is a lowest point of a concave edge, a pixel located at a curved corner around the lowest point of the concave edge, a highest point of a convex edge, or a pixel located at a curved corner around the highest point of the convex edge.

c may indicate an index of a reconstructed pixel, and a and b may indicate indexes of adjacent pixels at two sides of the current reconstructed pixel according to an edge direction. Xa, Xb, and Xc may respectively indicate pixel values of reconstructed pixels having the indexes a, b, and c. In the graphs of FIG. 6C, an x axis may denote indexes of the reconstructed pixel and the adjacent pixels at two sides thereof, and a y axis may denote pixel values of the pixels.

First Category 1 may indicate a case in which a current pixel is a lowest point of a concave edge, i.e., a local valley (Xc<Xa && Xc<Xb). As shown in a graph of First Category 1, when the current reconstructed pixel c between the adjacent pixels a and b is a lowest point of a concave edge, the current reconstructed pixel may be classified as category 1.

Second Category 2 may indicate a case in which a current pixel is located at a curved corner around a lowest point of a concave edge, i.e., a concave corner (Xc<Xa && Xc==Xb||Xc==Xa && Xc<Xb). As shown in a graph of Second Category 2, when the current reconstructed pixel c between the adjacent pixels a and b is located at an end point of a downward curve of a concave edge (Xc<Xa && Xc==Xb), or when the current reconstructed pixel c is located at a start point of an upward curve of a concave edge (Xc==Xa && Xc<Xb), the current reconstructed pixel may be classified as Second Category 2.

Third Category 3 may indicate a case in which a current pixel is located at a curved corner around a highest point of a convex edge, i.e., a convex corner (Xc>Xa && Xc==Xb||Xc==Xa && Xc>Xb). As shown in a graph of Third Category 3, when the current reconstructed pixel c between the adjacent pixels a and b is located at a start point of a downward curve of a convex edge (Xc==Xa && Xc>Xb), or when the current reconstructed pixel c is located at an end point of an upward curve of a convex edge (Xc>Xa && Xc==Xb), the current reconstructed pixel may be classified as Third Category 3.

Fourth Category 4 may indicate a case in which a current pixel is a highest point of a convex edge, i.e., a local peak (Xc>Xa && Xc>Xb). As shown in a graph of Fourth Category 4, when the current reconstructed pixel c between the adjacent pixels a and b is a highest point of a convex edge, the current reconstructed pixel may be classified as Fourth Category 4.

When the current reconstructed pixel does not satisfy any of the conditions of First Category 1, Second Category 2, Third Category 3, and Fourth Category 4, the current reconstructed pixel is not an edge and thus is classified as Zero Category 0, and an offset value of Zero Category 0 may not be encoded.

In an example embodiment, with respect to reconstructed pixels corresponding to the same category, an average value of difference values between the reconstructed pixels and original pixels may be determined as an offset value of a current category. Also, an offset value may be determined for each category. The average value may be performed with respect to each category determined by the method described above, and in this regard, each category may correspond to an SAO block.

Figure 7:
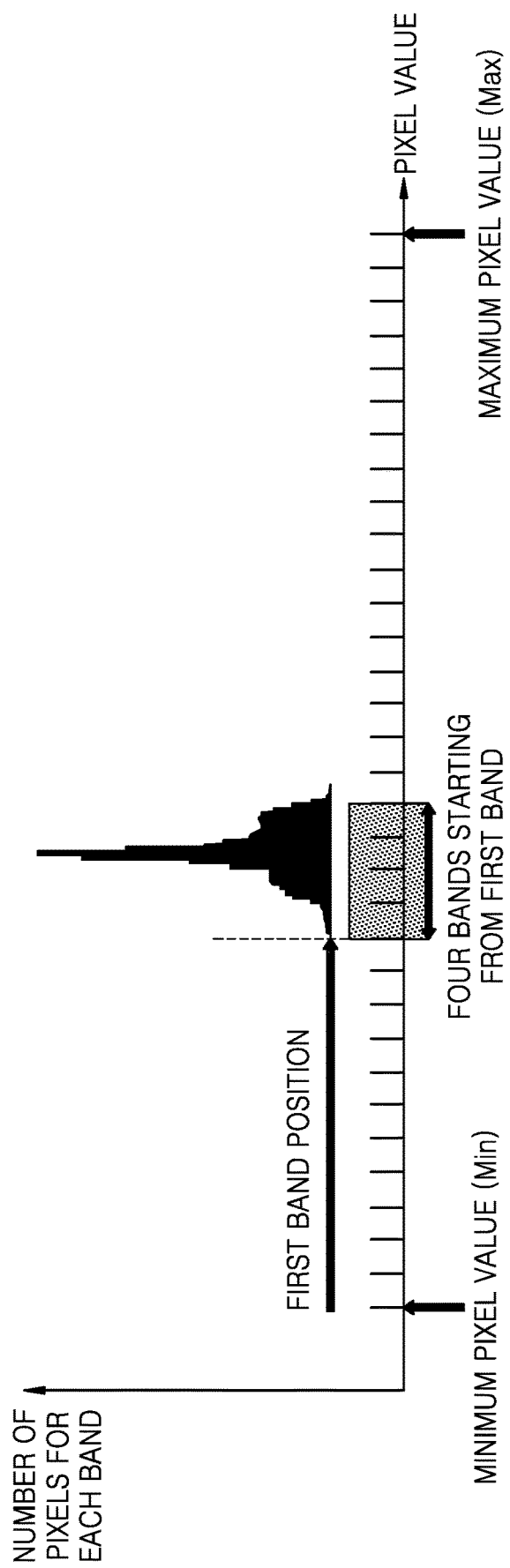
FIG. 7 is a diagram of an embodiment in which pixels are classified according to a band type according to an example embodiment of the inventive concept.

FIG. 7 is a diagram of an exemplary embodiment in which pixels are classified according to a band type.

According to an exemplary embodiment, each reconstructed pixel may belong to one of a plurality of bands. For example, pixel values obtained according to p bit sampling may have a minimum value Min, a maximum value Max, and a total range Min, . . . , (Min+2^(p−1))(=Max). When the total range (Min, Max) of the pixel values is divided into K pixel value sections, each pixel value section may be referred to as a band. When $B_k$ indicates a maximum value of a k-th band, bands may be divided into [$B_0$, $B_1$−1], [$B_1$, $B_2$−1], [$B_2$, $B_3$−1], . . . , and [$B_{k}$−1, $B_k$]. When a pixel value of a current reconstructed pixel belongs to the band [$B_k$−1, $B_k$], a current pixel may be determined as belonging to band k. The bands may be uniformly or non-uniformly divided.

For example, when pixel values are classified into uniform 8-bit pixel bands, the pixel values may be divided into 32 bands. In more detail, they may be classified into bands [0, 7], [8, 15], . . . , [240, 247], and [248, 255].

From among a plurality of bands classified according to a band type, a band to which a pixel value of each reconstructed pixel belongs may be determined. Also, an offset value indicating an average of errors between original pixels and reconstructed pixels in each band may be determined. In this regard, each band may correspond to an SAO block.

Figure 8:
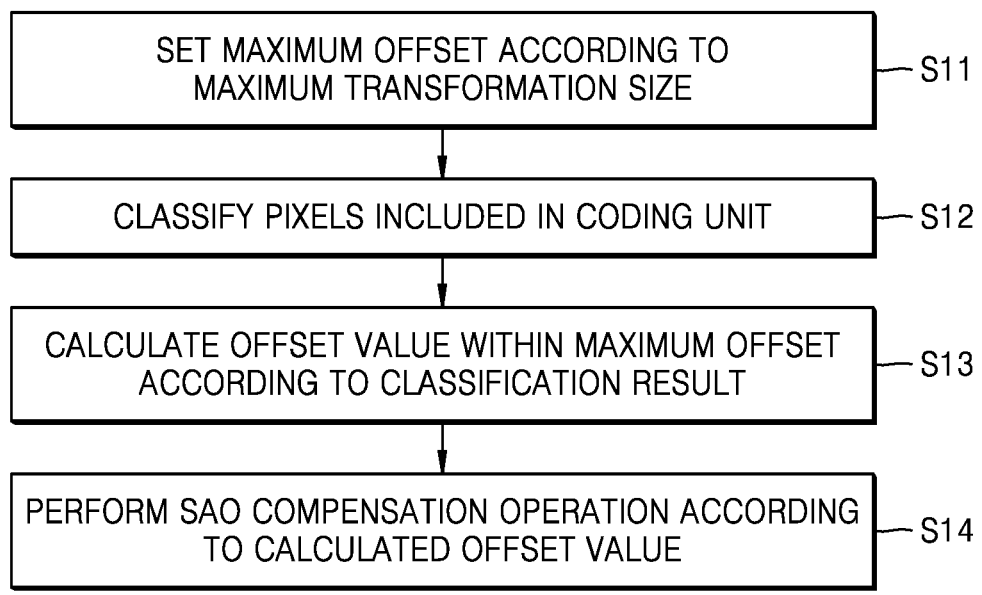
FIG. 8 is a flowchart of an image processing method according to an example embodiment of the inventive concept.

FIG. 8 is a flowchart of an image processing method according to an example embodiment of the inventive concept.

Referring to FIG. 8, an image processing apparatus (for example, an image transmitting apparatus) may perform an encoding operation with respect to a frame image, and may perform a decoding operation regarding the encoded image to generate a reference image for use in inter prediction in the image processing apparatus. Also, an SAO encoding operation may be performed with respect to a reconstructed image, and SAO compensation may be performed using an offset value equal to or less than a maximum offset.

For example, a transformation and quantization operation may be performed in an encoding operation regarding a frame image, and the transformation and quantization operation may be performed with respect to an LCU or with respect to a CU generated by splitting the LCU at least once. In this regard, a maximum transformation size for performing the transformation and quantization operation may correspond to the LCU, and a maximum offset having a value adjusted according to the maximum transformation size may be set (operation S11).

Also, in performing the SAO encoding operation, a classification operation regarding pixels included in the CU may be performed (operation S12), and the CU may include one or more SAO blocks according to a classification result. Also, according to the classification result regarding the pixels, an offset value may be calculated within the set maximum offset (operation S13). For example, offset values different from each other may be calculated with respect to SAO blocks, and the same offset value may be applied to pixels belonging to any one SAO block. An SAO compensation operation according to the offset value calculated as described above may be performed (operation S14).

Figure 9:
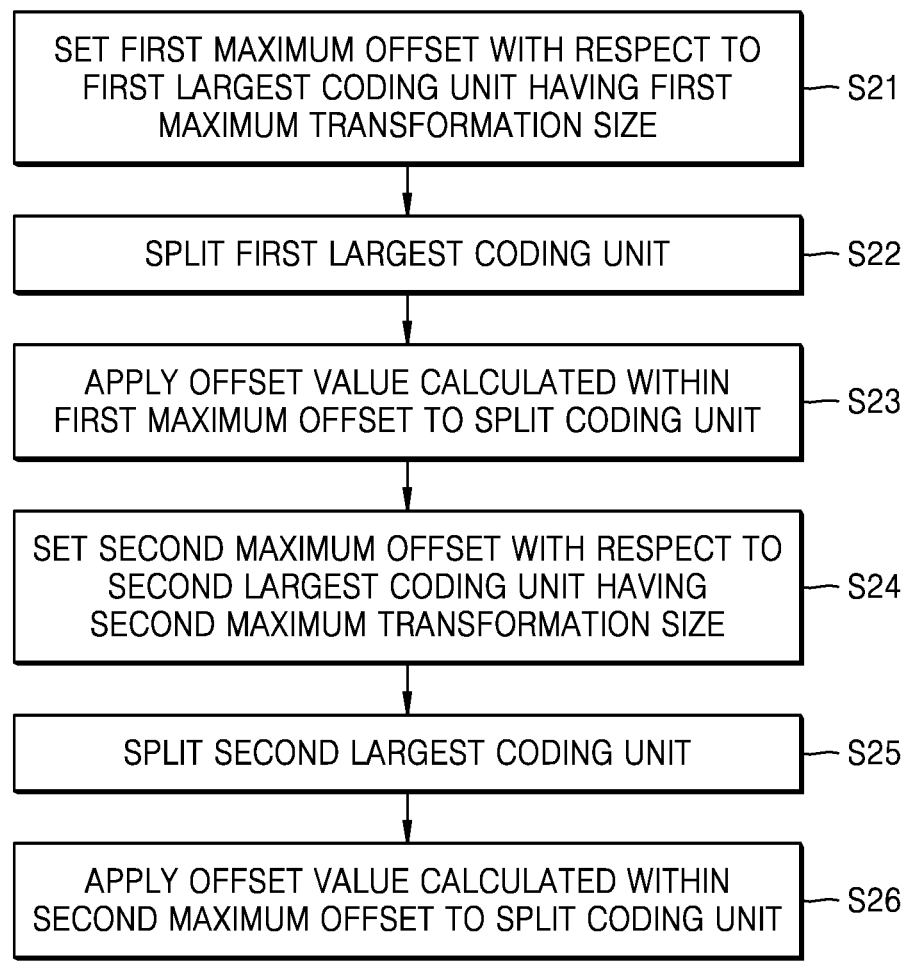
FIG. 9 is a flowchart of an image processing method according to another example embodiment of the inventive concept.

FIG. 9 is a flowchart of an image processing method according to another example embodiment of the inventive concept. A first LCU and a second LCU shown in FIG. 9 may be included in the same frame image. Alternatively, the first LCU may be included in a first frame image, and the second LCU may be included in a second frame image.

Referring to FIG. 9, a first maximum offset may be set with respect to the first LCU having a first maximum transformation size (operation S21). Also, the first LCU may be split into a plurality of CUs (operation S22), or into one or more coding units, and a classification operation according to the previous exemplary embodiments may be performed with respect to each of the plurality of CUs. Also, according to a classification result, an SAO compensation operation using an offset value calculated within the first maximum offset may be performed with respect to each of the CUs (operation S23).

The second LCU may have a second maximum transformation size, and the second maximum transformation size and the first maximum transformation size may have different values from each other. Accordingly, a second maximum offset may be set with respect to the second LCU (operation S24). According to the previous exemplary embodiment, when the second maximum transformation size is greater than the first maximum transformation size, the second maximum offset may be less than the first maximum offset. On the other hand, when the second maximum transformation size is less than the first maximum transformation size, the second maximum offset may be greater than the first maximum offset, e.g., first value of the first maximum offset and a second value of the second maximum offset may be different, or the first maximum value of the first offset and the second maximum value of the second offset may be different. In a similar way to the first LCU, the second LCU may be split into a plurality of CUs (operation S25), or one or more coding units, and an SAO compensation operation using an offset value calculated within the second maximum offset may be performed with respect to each of the plurality of CUs (operation S26).

Figure 10:
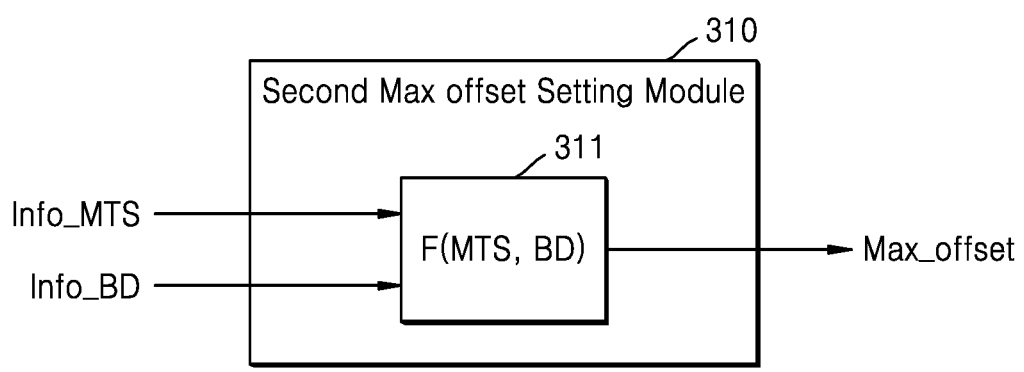

FIGS. 10 and 11 are diagrams of an example of setting a maximum offset.

According to an exemplary embodiment, an offset value may be calculated via First Equation 1 below.

SaoOffsetVal=SaoOffsetSign*
SaoOffsetAbs<<SaoOffsetScale        [First Equation 1]

As for a parameter set of HEVC, for example, in First Equation 1 above, SaoOffsetVal may denote an offset value, SaoOffsetSign may denote an offset sign, SaoOffsetAbs may denote an offset absolute value, and SaoOffsetScale may denote offset scale information. Also, equation symbol << may denote a bit shift operation.

FIGS. 10 and 11 show an example of defining a maximum value of the offset absolute value SaoOffsetAbs according to a maximum transformation size. Referring to FIG. 10, a maximum offset may be calculated via operation processing according to a predetermined functional formula, i.e., according to a predetermined functional formula operation. For example, an SAO encoder may include a second maximum offset setting module 310, and the second maximum offset setting module 310 may include an operation unit 311 that performs predetermined operation processing using input values. The function of the second maximum offset setting module 310 may be implemented in a hardware manner, or may be implemented in a software manner by executing programs stored in a working memory (not shown), whereby the programs are executable by a main processor.

According to an exemplary embodiment, the operation unit 311 may receive an input of information, e.g., an input of first information Info_MTS related to a maximum transformation size and second information Info_BD related to a bit depth, and may calculate a maximum offset Max offset by performing a functional operation regarding the first information and the second information Info_MTS and Info_BD. That is, the operation unit 311 may calculate the maximum offset Max offset in real time, based on the first information and the second information Info_MTS and Info_BD that are input.

FIG. 11 shows an example of the maximum offset Max offset calculated by the second maximum offset setting module 310 shown in FIG. 10. As the functional formula described above, an operation according to a formula shown in FIG. 11 may be performed, and as a result, the maximum offset Max offset in a table shown in FIG. 11 may be calculated.

As an example of the operation, a smaller value is selected from among a bit depth value and a predetermined bit number (for example, 10 bits), and a difference between a value obtained by applying logarithm to a maximum (MAX) transformation size $Tx_{MAX}$ and the selected value is calculated. Also, a shift operation is performed as much as a bit number corresponding to the calculated difference, and 1 may be subtracted from a shift operation result. According to the operation result described above, an example in which, when the maximum transformation size $Tx_{MAX}$ is 32*32, the maximum offset Max offset is calculated as 7, when the maximum transformation size $Tx_{MAX}$ is 16*16, the maximum offset Max offset is calculated as 15, when the maximum transformation size $Tx_{MAX}$ is 8*8, the maximum offset Max offset is calculated as 31, and when the maximum transformation size $Tx_{MAX}$ is 4*4, the maximum offset Max offset is calculated as 63 is shown in the table of FIG. 11.

Figure 12:
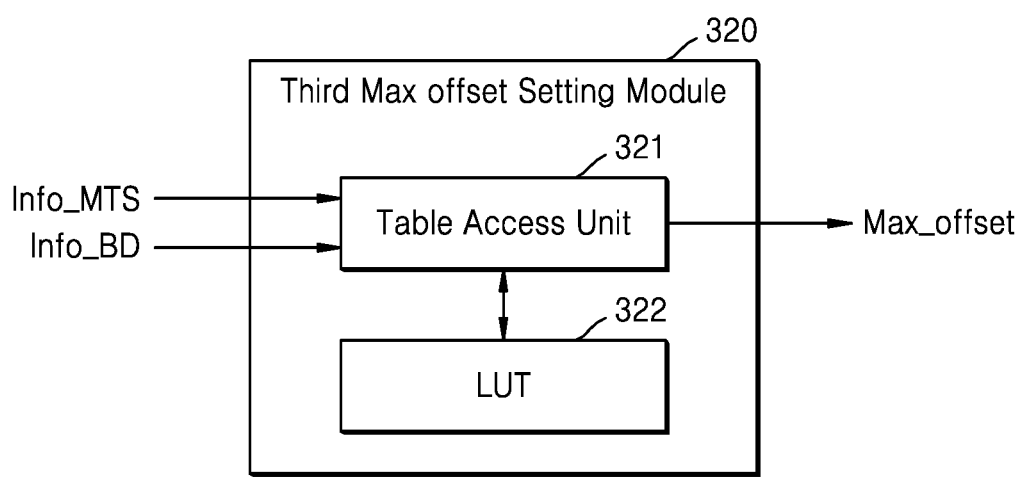
Figure 13B:
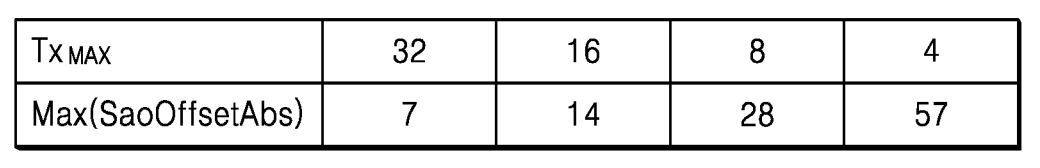

FIGS. 12 to 13B are diagrams of another example of setting a maximum offset. FIGS. 12 to 13B show an example in which a maximum offset Max offset corresponding to the pieces of information Info_MTS and Info_BD described above is previously calculated and stored in the form of a table, and the maximum offset Max offset corresponding to input pieces of information Info_MTS and Info_BD is read from an information table. Also, FIGS. 12 to 13B show an example of defining a maximum value of an offset absolute value SaoOffsetAbs according to a maximum transformation size.

Referring to FIG. 12, the third maximum offset setting module 320 may include a lookup table 322 in which the maximum offset Max offset corresponding to first information Info_MTS related to a maximum transformation size and second information Info_BD related to a bit depth is stored, and may also include a table access unit 321 that accesses the lookup table 322 according to the first information and the second information Info_MTS and Info_BD described above.

The maximum offset Max offset optimized in response to the first information and the second information Info_MTS and Info_BD may be calculated and stored in the lookup table 322, and for example, the stored maximum offset Max offset may correspond to that shown in FIGS. 13A and 13B. FIGS. 13A and 13B show a calculation example of the maximum offset Max offset in a case in which, when a QP applied during a quantization process corresponds to 51, a maximum error corresponding to 228 occurs. Also, although FIGS. 13A and 13B illustrate the maximum offset Max offset according to the maximum transformation size at a bit depth of a certain value (for example, 8 bits), information regarding the maximum offset Max offset corresponding to bit depths having other values may be further stored in the lookup table 322.

Referring to FIGS. 13A and 13B, when the maximum transformation size is 32*32, an average error per each pixel has a value of about 7.125, and the maximum offset Max offset corresponding to 7 may be stored to correspond to the maximum transformation size of 32*32. Similarly, the maximum offset Max offset corresponding to 14 may be stored in the lookup table 322 to correspond to the maximum transformation size of 16*16, the maximum offset Max offset corresponding to 28 may be stored in the lookup table 322 to correspond to the maximum transformation size of 8*8, and the maximum offset Max offset corresponding to 57 may be stored in the lookup table 322 to correspond to the maximum transformation size of 4*4.

In setting a maximum offset, Second Equation 2 below indicates an example using a manner in which the offset scale information SaoOffsetScale in First Equation 1 above is changed according to a maximum transformation size.

$$SaoOffsetScale = Max(0, Bitdepth-10) + 5 - LOG\ 2(Tx_{MAX}) \quad \text{[Second Equation 2]}$$

A maximum value of an offset value may be adjusted using First Equation 1 and Second Equation 2 above. For example, the offset value SaoOffsetVal may be increased via a shift operation according to the offset scale information SaoOffsetScale, and a value of the offset scale information SaoOffsetScale may be changed according to the maximum transformation size $Tx_{MAX}$. For example, when a bit depth corresponds to 11 bits, and the maximum transformation size $Tx_{MAX}$ corresponds to 32*32, the offset scale information SaoOffsetScale may correspond to 1. That is, according to Second Equation 2, as the maximum transformation size $Tx_{MAX}$ decreases, a value of the offset scale information SaoOffsetScale increases, and when First Equation 1 and Second Equation 2 are applied, the offset scale information SaoOffsetScale has a large value, and thus, a maximum offset may increase.

FIG. 14 is a diagram of an example of a syntax structure having an SAO parameter defined. The syntax structure may be variously modified, and accordingly, detailed descriptions of FIG. 14 that are not related to exemplary embodiments of the inventive concept will be omitted below.

An image transmitting apparatus may transmit a bitstream including a syntax shown in FIG. 14 to an image receiving apparatus, and the image receiving apparatus may obtain an SAO parameter by parsing the syntax and may perform SAO compensation based on the SAO parameter.

The syntax may include a parameter SaoTypeIdx indicating whether SAO compensation is performed in a current frame image (or slice) and indicating an edge type or a band type. The parameter SaoTypeIdx may include information regarding an edge category in the edge type or information regarding a band category in the band type. Also, the syntax may include an offset value (for example, an SAO offset absolute value sao_offset_abs) calculated with respect to each SAO block in a frame image. According to an exemplary embodiment of the inventive concept, a maximum offset may be adjusted based on a maximum transformation size, and the SAO offset absolute value sao_offset_abs may correspond to a value within the set maximum offset.

Also, the syntax may include offset sign information sao_offset_sign indicating whether to add or subtract the SAO offset absolute value sao_offset_abs with respect to each pixel. Also, the syntax may include band position information sao_band_position indicating a position of blocks on which SAO compensation is to be performed from among a plurality of SAO blocks. For example, the band position information sao_band_position may indicate a start position of a band on which SAO compensation is to be performed from among s plurality of bands, and SAO compensation may be performed on a predetermined number of bands, starting from a band that is instructed by the band position information sao_band_position. Also, SAO compensation may be performed with respect to each of a luma component and a chroma component, and the syntax may include information sao_eo_class_luma indicating whether to perform SAO compensation with respect to the luma component and information sao_eo_class_chroma indicating whether to perform SAO compensation with respect to the chroma component.

Figure 15:
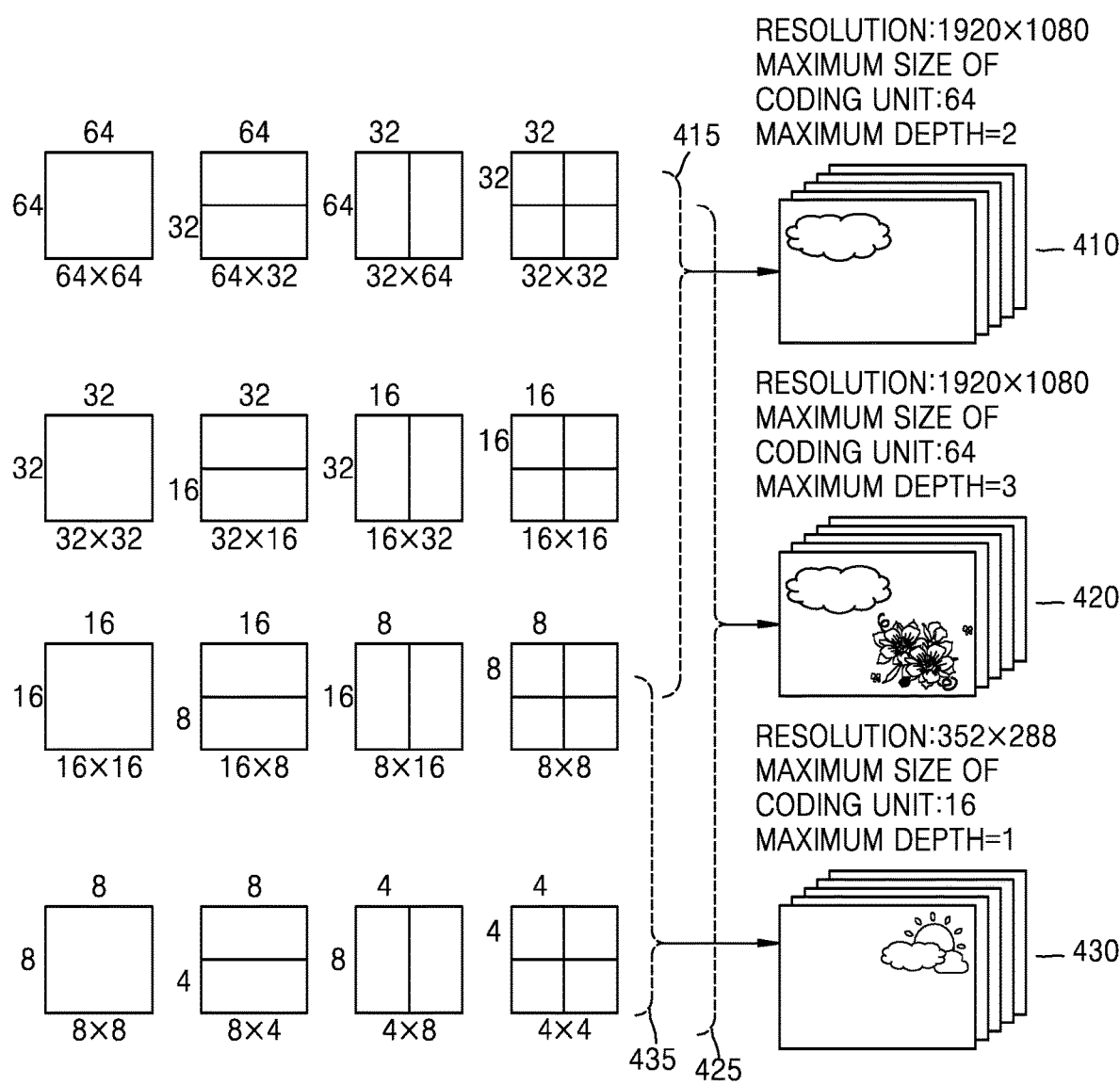
FIG. 15 shows the concept of a coding unit according to an example embodiment of the present disclosure.

FIG. 15 shows the concept of a coding unit according to an example embodiment of the present disclosure. The coding unit may be a unit corresponding to the transformation size or the CU described above.

Referring to FIG. 15, a size of the coding unit may be expressed by width×height, and may be 64×64, 32×32, 16×16, and 8×8. A maximum coding unit of 64×64 may be split into coding units of 64×64, 64×32, 32×64, or 32×32, and a coding unit of 32×32 may be split into coding units of 32×32, 32×16, 16×32, or 16×16, a coding unit of 16×16 may be split into coding units of 16×16, 16×8, 8×16, or 8×8, and a coding unit of 8×8 may be split into coding units of 8×8, 8×4, 4×8, or 4×4.

For example, in a first frame image 410, a resolution may be 1920×1080, a maximum size of a coding unit may be 64, and a maximum depth may be 2. Alternatively, in the case of a second frame image 420, a resolution may be 1920×1080, a maximum size of a coding unit may be 64, and a maximum depth may be 3. Alternatively, in the case of a third frame image 430, a resolution may be 352×288, a maximum size of a coding unit may be 16, and a maximum depth may be 1. The maximum depth shown in FIG. 15 denotes the total number of splits from an LCU to a smallest coding unit.

When a resolution is high or a data amount is large, it is preferable that a maximum size of a coding unit is large so as to increase encoding efficiency and accurately reflect image characteristics. Accordingly, the maximum size of the coding unit of the first frame image 410 and second frame image 420 having a high resolution may be selected as 64.

Since the maximum depth of the first frame image 410 is 2, first coding units 415 of the first frame image 410 may include an LCU having a long axis size of 64, and coding units having long axis sizes of 32 and 16 since depths are deepened to two layers by splitting the LCU twice. On the other hand, since the maximum depth of the third frame image 430 is 1, third coding units 435 of the third frame image 430 may include an LCU having a long axis size of 16, and coding units having a long axis size of 8 since depths are deepened to one layer by splitting the LCU once.

Since the maximum depth of the second frame image 420 is 3, second coding units 425 of the second frame image 420 may include an LCU having a long axis size of 64, and coding units having long axis sizes of 32, 16, and 8 since depths are deepened to three layers by splitting the LCU three times. As a depth deepens, capability of expressing detailed information may improve.

Figure 16A:
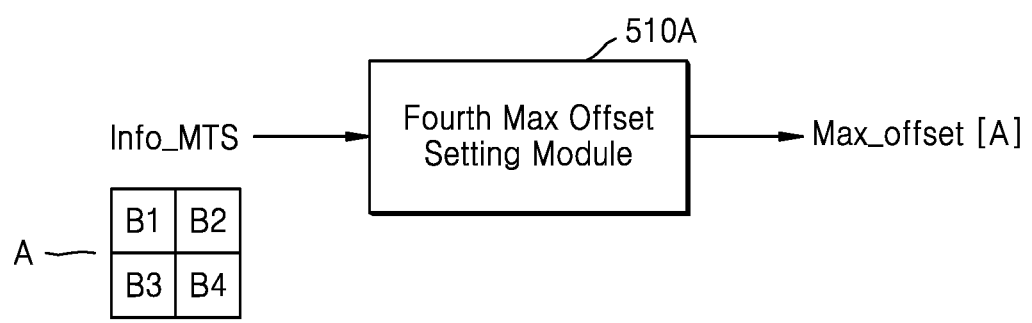
FIGS. 16A to 16C are block diagrams of various operation examples of a maximum offset setting module according to example embodiments of the inventive concept.
Figure 16B:
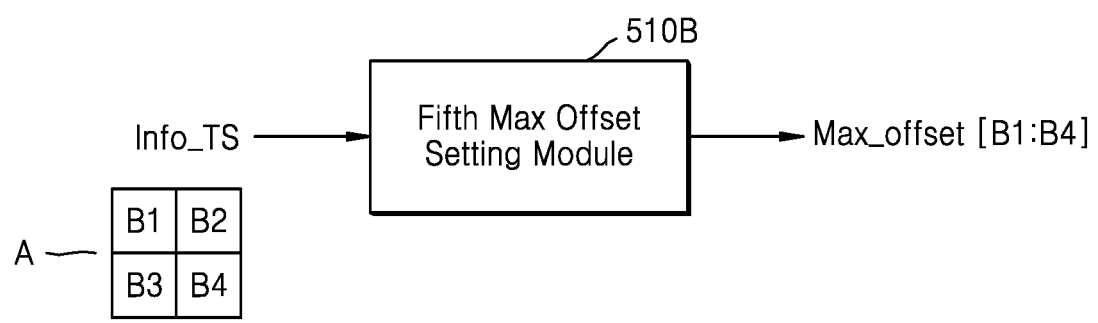
Figure 16C:
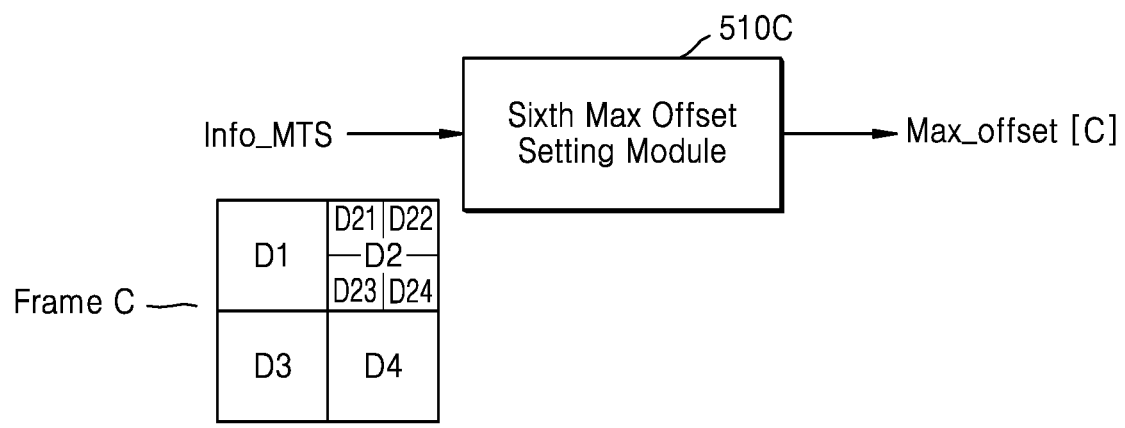

FIGS. 16A to 16C are block diagrams of various operation examples of a maximum offset setting module that may be applied to exemplary embodiments of the inventive concept. Fourth maximum offset setting module 510A, fifth maximum offset setting module 510B, and sixth maximum offset setting module 510C shown in FIGS. 16A to 16C may calculate a maximum offset Max offset via various methods according to the previous exemplary embodiments, and for example, the maximum offset Max offset may be calculated in real time via an operation using a predetermined functional formula, or may be obtained by reading information previously stored in the form of a table, i.e., accessing table information.

Referring to FIG. 16A, a size of an image A corresponding to an LCU may correspond to a maximum transformation size, and maximum transformation size information Info_MTS may be provided to the fourth maximum offset setting module 510A. The image A corresponding to the LCU may be split at least once according to the previous exemplary embodiments, and transformation and quantization processing may be performed with respect to each of split images B1 to B4.

A maximum offset Max offset[A] may be set with respect to each image A corresponding to the LCU, and for example, when the maximum offset Max offset[A] is set, the set maximum offset Max offset[A] may be commonly applied to the split images B1 to B4. Also, in a syntax structure according to the previous exemplary embodiment, an SAO parameter generated based on the maximum offset Max offset[A] may be encoded with respect to each LCU and be transmitted.

Referring to FIG. 16B, an image A corresponding to an LCU may be split into a plurality of images B1 to B4, and a maximum offset may be set with respect to each of the plurality of images B1 to B4. For example, the fifth maximum offset setting module 510B may calculate and output maximum offsets Max offset[B1:B4] respectively corresponding to the images B1 to B4. Accordingly, the maximum offsets Max offset[B1:B4] different from each other may be applied to the images B1 to B4. Also, in a syntax structure according to the previous exemplary embodiment, an SAO parameter generated based on the maximum offsets Max offset[B1:B4] may be encoded with respect to each CU and be transmitted.

Referring to FIG. 16C, a frame image C may include images D1 to D4 corresponding to largest coding units (LCUs), i.e., a plurality of LCUs, and images corresponding to at least some LCUs may be split into a plurality of CUs. For example, the image D2 corresponding to an LCU may be split into images D21 to D24 corresponding to a plurality of CUs.

A maximum offset Max offset[C] may be set with respect to each frame image C. For example, a maximum transformation size may be defined with respect to the frame image C, and the sixth maximum offset setting module 510C may calculate the maximum offset Max offset[C] corresponding to the maximum transformation size. The maximum offset Max offset[C] may be commonly applied to the frame image C. Also, in a syntax structure according to the previous exemplary embodiment, an SAO parameter generated based on the maximum offset Max offset[C] may be encoded with respect to each frame image and be transmitted.

Figure 17A:
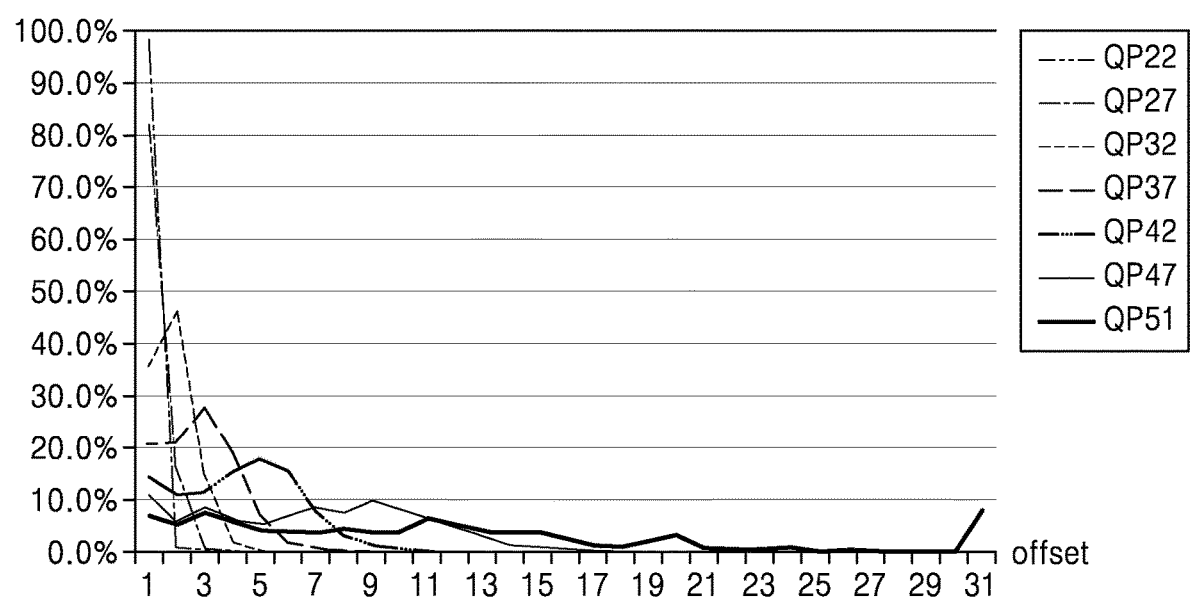
FIGS. 17A and 17B are diagrams of an example of setting a maximum offset in SAO compensation according to a modifiable example embodiment of the inventive concept.
Figure 17B:
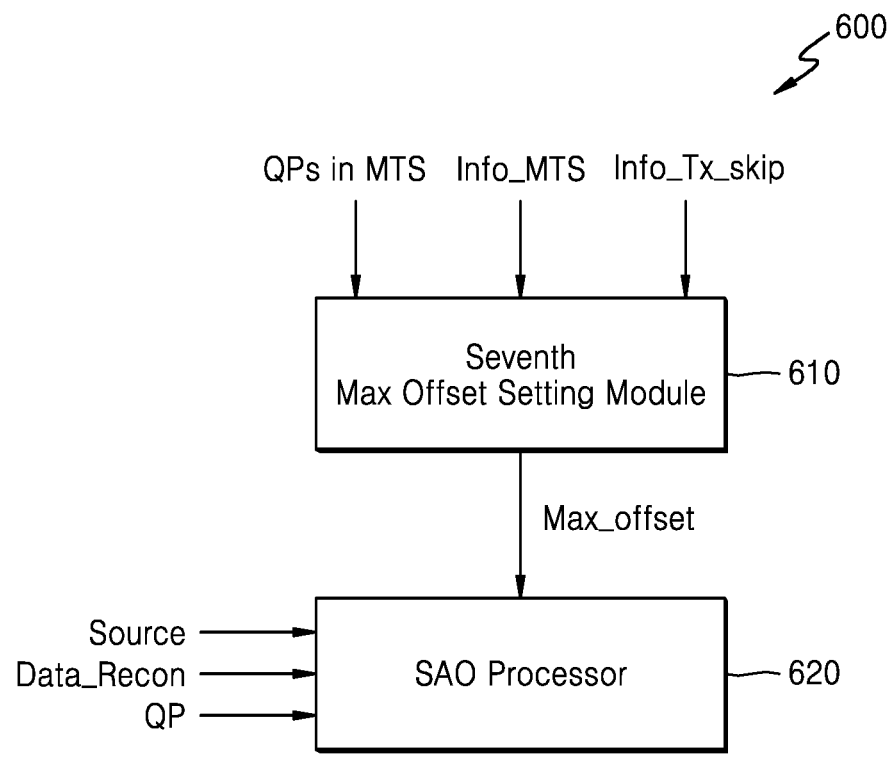

FIGS. 17A and 17B are diagrams of an example of adjusting a maximum offset according to a modifiable exemplary embodiment of the inventive concept.

FIG. 17A shows an example of an experiment result graph regarding distribution of offset values according to QPs. FIG. 17A may be a graph of distribution of offset values obtained by applying different QPs to the same transformation size.

As a QP has a small value, e.g., a quantization parameter value has a small value, a loss during an encoding process may be small. Accordingly, as the QP has a small value, the majority of offset values required for an SAO compensation operation may be distributed around a value of 1. That is, as the QP has a small value, offset values used in SAO compensation may have a small dynamic range.

On the other hand, as the QP has a large value, the loss during the encoding process may be large. Accordingly, as the QP has a large value, offset values required for the SAO compensation operation may be distributed over various values, compared with the case in which the QP has a small value. That is, as the QP has a large value, the offset values used in SAO compensation may have a large dynamic range.

As shown in FIG. 17B, an second SAO encoder 600 may include a seventh maximum offset setting module 610 and an SAO processor 620. Although FIG. 17B shows, for convenience of illustration, the SAO processor 620 calculating an SAO parameter and performing SAO compensation, calculation of an SAO parameter and SAO compensation may be performed by separate functional blocks, as in the previous exemplary embodiments.

The seventh maximum offset setting module 610 may receive QP information QPs in MTS and maximum transformation size information Info_MTS and may calculate a maximum offset Max_offset based on the QP information QPs in MTS and the maximum transformation size information Info_MTS. According to an exemplary embodiment, the seventh maximum offset setting module 610 may further receive transformation skip information Info_Tx_skip, and the transformation skip information Info_Tx_skip may indicate whether a transformation operation has been skipped during an image processing process. For example, in a video standard such as HEVC, a quantization operation may be performed without performing a transformation operation, and a value of the transformation skip information Info_Tx_skip may be changed according to whether to perform the transformation operation. When the transformation operation is not performed, the transformation size described above may correspond to a minimum size (for example, 1*1 pixel size).

According to an exemplary embodiment, the seventh maximum offset setting module 610 may calculate the maximum offset Max offset as a largest value when the transformation skip information Info_Tx_skip is activated. For example, when the transformation skip information Info_Tx_skip is activated, a predetermined largest value may be calculated as the maximum offset Max offset without performing a separate operation.

Also, according to an exemplary embodiment, the QP information QPs in MTS may correspond to a QP applied to a maximum transformation size. As in the previous exemplary embodiment, a maximum offset Max_offset may be increased or decreased according to a value of the QP applied to the maximum transformation size.

The SAO processor 620 may generate an SAO parameter based on the maximum offset Max_offset from the seventh maximum offset setting module 610. As in the previous exemplary embodiments, the SAO processor 620 may generate the SAO parameter based on an original image Source and a reconstructed image Data_Recon. Also, the SAO parameter may include various pieces of information such as an offset value for SAO compensation, an offset sign, and an SAO compensation position.

According to an exemplary embodiment, the SAO processor 620 may calculate an offset value by further using a QP. For example, the SAO processor 620 may calculate an offset value that is to be allocated to pixels (or SAO blocks) based on pixel values of the original image Source and the reconstructed image Data_Recon. In this regard, the calculated offset value may be adjusted according to the QP applied to each CU, or SAO processing unit. According to an exemplary embodiment, when the maximum offset Max_offset increases as the QP information QPs in MTS has a large value, an adjustment operation may be performed to decrease the offset value based on the QP. On the other hand, when the maximum offset Max_offset decreases as the QP information QPs in MTS has a small value, an adjustment operation may be performed to increase the offset value based on the QP. Via the adjustment operation based on the QP, described above, an optimal offset value may be calculated by taking into account picture quality of a reconstructed image (or reference image) and an amount of information of an SAO parameter.

Figure 18:
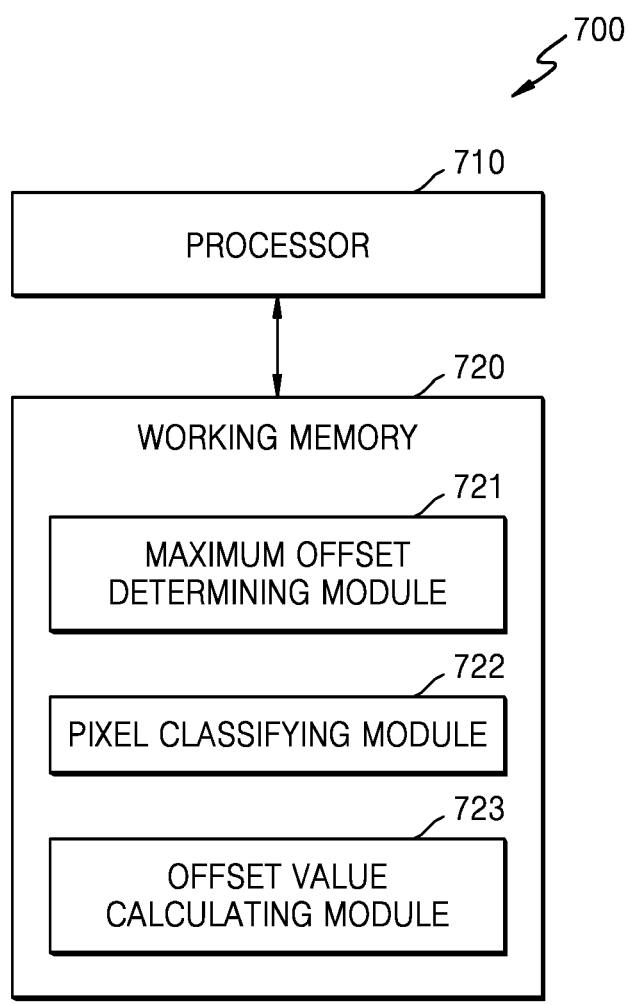
FIG. 18 is a block diagram of an example of software implementation of an image processing method according to example embodiments of the inventive concept.

FIG. 18 is a block diagram of an example of software implementation of an image processing method according to exemplary embodiments of the inventive concept.

Referring to FIG. 18, a first image processing apparatus 700 may include a processor 710 and a working memory 720. The processor 710 may execute programs stored in the working memory 720. The working memory 720 may store programs for processing, in a software manner, at least some of various functions for SAO processing according to the previous exemplary embodiments, and the programs may include a maximum offset determining module 721, a pixel classifying module 722, and an offset value calculating module 723 according to the functions.

For example, the processor 710 may control an overall SAO processing operation according to exemplary embodiments of the inventive concept. For example, the processor 710 may determine a maximum offset regarding a predetermined unit (for example, a frame image, an LCU, a CU, etc.) by executing the maximum offset determining module 721. For example, as the maximum offset determining module 721 is executed, a functional formula operation according to the previous exemplary embodiment may be performed or an access operation of table information may be performed, and based on this, a maximum offset may be determined.

Also, the processor 710 may perform a classification operation of pixels related to SAO compensation by executing the pixel classifying module 722. For example, an edge type or a band type may be applied to pixels, and the pixels may be classified into one or more SAO blocks via a classification operation based on various classes and categories. Also, the processor 710 may calculate an offset value for SAO compensation with respect to each of the pixels via execution of the offset value calculating module 723, and according to an exemplary embodiment, an offset value may be calculated with respect to each SAO block classified via the classification operation. Although not shown in FIG. 18, an SAO compensation operation using the calculated offset value may be performed, and the SAO compensation operation may be performed in a hardware manner or a software manner.

Figure 19:
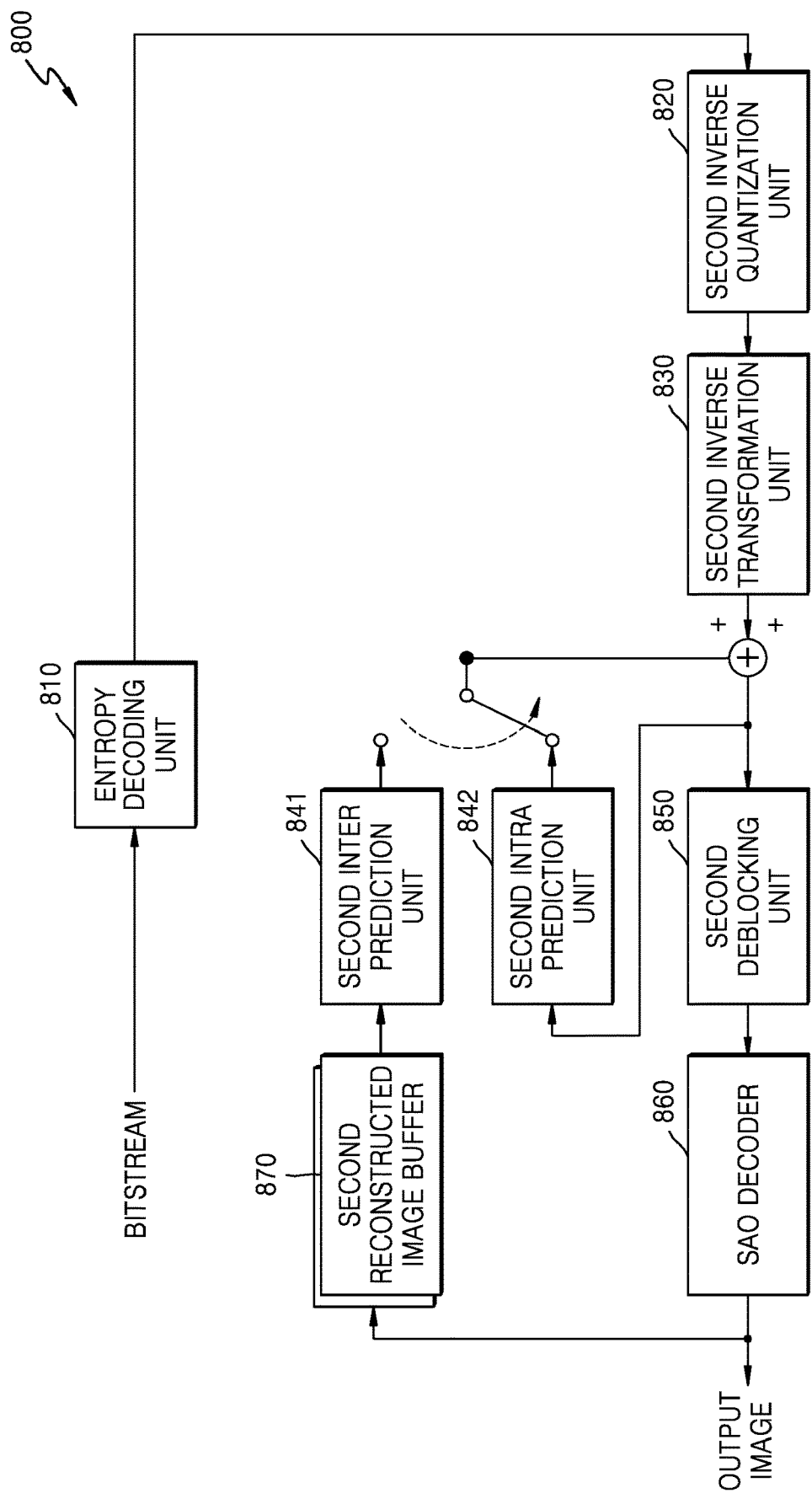
FIG. 19 is a block diagram of configurations of an image processing apparatus according to an example embodiment of the inventive concept.

FIG. 19 is a block diagram of configurations of a second image processing apparatus 800 according to an example embodiment of the present disclosure. The second image processing apparatus 800 of FIG. 19 may correspond to an image receiving apparatus that performs a decoding operation on a received bitstream.

The second image processing apparatus 800 may include an entropy decoding unit 810, a second inverse quantization unit 820, an inverse transformation unit 830, a second inter prediction unit 841, a second intra prediction unit 842, a second deblocking unit 850, an SAO decoder 860, and a second reconstructed image buffer 870.

The second image processing apparatus 800 may receive a bitstream including encoded image data. The entropy decoding unit 810 may have intra mode information, inter mode information, an SAO parameter, image data, and the like parsed from the bitstream. The image data extracted from the entropy decoding unit 810 may be quantized transformation coefficients. The second inverse quantization unit 820 may restore transformation coefficients by performing inverse quantization with respect to the image data, and the inverse transformation unit 830 may restore pieces of image data of a spatial domain by performing inverse transformation with respect to the restored transformation coefficients.

With respect to image data of the spatial domain, the second intra prediction unit 842 may perform intra prediction on coding units of an intra mode. Also, the second inter prediction unit 841 may perform inter prediction by using a reference image from the second reconstructed image buffer 870. An output image may be generated via a postprocessing operation using the second deblocking unit 850 and the SAO decoder 860 regarding image of the spatial domain having gone through the second inter prediction unit 841 or the second intra prediction unit 842.

The SAO decoder 860 may perform an SAO decoding operation by using the SAO parameter extracted by the entropy decoding unit 810. According to an exemplary embodiment of the inventive concept, a maximum offset value used in the SAO decoding operation may be adjusted with respect to each frame image, each LCU, or each CU.

Figure 20:
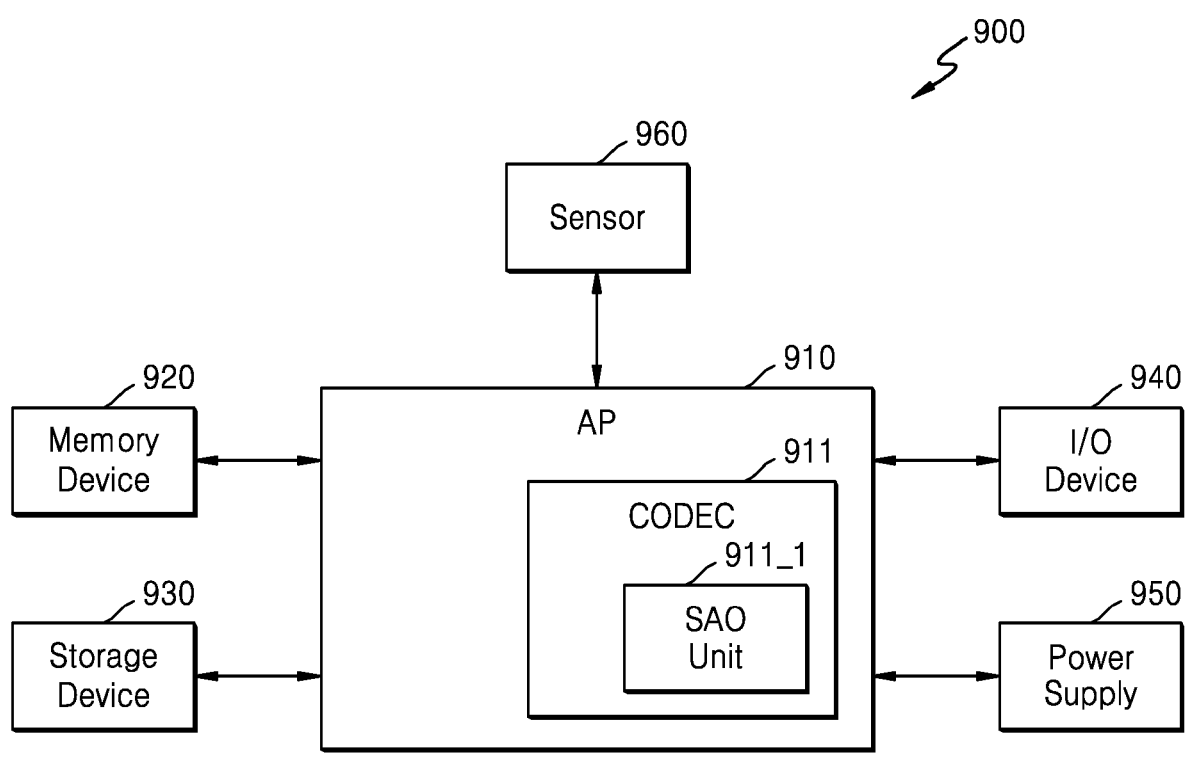
FIG. 20 is a block diagram of a computing system including an image processing apparatus according to the previous embodiments, according to an example embodiment of the inventive concept.

FIG. 20 is a block diagram of a computing system 900 according to an exemplary embodiment, the computing system 900 including an image processing apparatus according to the previous exemplary embodiments.

Referring to FIG. 20, the computing system 900 may include an application processor 910, a memory device 920, a storage device 930, an input/output device 940, a power supply 950, and an image sensor 960. Although not shown in FIG. 20, the computing system 900 may further include ports for communication with a video card, a sound card, a memory card, a Universal Serial Bus (USB) device, or other electronic devices.

The application processor 910 may be implemented as a system on chip (SoC). The application processor 910 may perform certain calculations or tasks. In some exemplary embodiments, the application processor 910 may include a microprocessor and a central processing unit (CPU). The application processor 910 may communicate with the memory device 920, the storage device 930, and the input/output device 940 via an address bus, a control bus, and a data bus. The memory device 920 may store data required for an operation of the computing system 900. For example, the memory device 920 may be implemented as dynamic random access memory (DRAM), mobile DRAM, SRAM, flash memory, PRAM, FRAM, Resistive random-access memory (RRAM) and/or Magnetoresistive random-access memory (MRAM). The storage device 930 may include a solid state drive (SSD), a hard disk drive (HDD), or a CD-ROM. The input/output device 940 may include an input means such as a keyboard, a keypad, a mouse, etc., and an output means such as a printer, a display, etc. The power supply 950 may supply an operating voltage required for an operation of the computing system 900.

The application processor 910 may include a codec module 911 that performs an image processing operation according to one or more exemplary embodiment of the inventive concept, and the codec module 911 may include an SAO unit 9111. The SAO unit 9111 may determine a size of a predetermined unit (for example, a maximum transformation size) and may adjust a maximum offset value for SAO compensation, based on the size of a predetermined unit. Also, an SAO compensation operation for each pixel may be performed according to the adjusted maximum offset value.

In an image processing method and apparatus according to one or more exemplary embodiments of the inventive concept, SAO compensation performance may be increased by adaptively increasing a maximum offset in SAO encoding, and an amount of information regarding an SAO parameter may be decreased by adaptively decreasing the maximum offset.

While the inventive concept has been particularly shown and described with reference to exemplary embodiments thereof, it will be understood that various changes in form and details may be made therein without departing from the spirit and scope of the following claims.

What is claimed is:

1. An image processing method comprising:
performing, based on a first largest coding unit (LCU) and a coding unit (CU), an encoding operation on a frame image;
identifying a maximum transformation site associated with the first LCU;
performing a functional operation using: i) first information related to the maximum transform size and ii) second information related to a bit depth;
calculating a maximum value based on the functional operation;
setting, for the first LCU and a second LCU of the frame image, a maximum offset to the maximum value; and
calculating, based on the maximum offset, a sample adaptive offset (SAO) parameter for use in sample adaptive offset (SAO) compensation.

2. The image processing method of claim 1, wherein the maximum transformation size is corresponding to a maximum processing unit of a transformation operation and a quantization operation in the encoding operation, and
as the maximum transformation size increases, the maximum offset decreases, and as the maximum transformation size decreases, the maximum offset increases.

3. The image processing method of claim 2, wherein the maximum transformation size is corresponding to a number of pixels in the largest coding unit (LCU).

4. The image processing method of claim 1, wherein the calculating, based on the maximum offset, the sample adaptive offset (SAO) parameter comprises:
classifying pixels in the largest coding unit (LCU) or the CU into one or more SAO blocks; and
allocating an offset value less than or equal to the maximum offset to each of the one or more SAO blocks.

5. The image processing method of claim 1, wherein, as the bit depth increases, the maximum offset increases, and as the bit depth decreases, the maximum offset decreases.

6. The image processing method of claim 1, wherein the setting the maximum offset comprises calculating the maximum offset by further using a quantization parameter in a quantization operation of the encoding operation, and
with respect to the maximum transformation size, as a quantization parameter value increases, the maximum offset increases, and as the quantization parameter value decreases, the maximum offset decreases.

7. The image processing method of claim 1, wherein a table comprising information regarding the maximum offset corresponding to the maximum transformation size is stored in an image processing apparatus, and
the setting the maximum offset comprises calculating the maximum offset by reading the information from the table based on an input of information related to the maximum transformation size.

8. The image processing method of claim 1, further comprising:
reconstructing, with respect to the frame image having the encoding operation performed thereon, the frame image to generate a reference image for use in inter prediction; and
performing SAO compensation by using the sample adaptive offset (SAO) parameter, with respect to a reconstructed image.

9. The image processing method of claim 1, further comprising transmitting a bitstream comprising the sample adaptive offset (SAO) parameter and image data generated according to the encoding operation,
wherein the sample adaptive offset (SAO) parameter comprises a parameter indicating an offset value that is to be used in SAO compensation, and when the maximum offset decreases, an amount of information of the parameter indicating the offset value decreases.

10. An image processing method comprising:
performing, based on a first maximum transformation size, a first encoding operation on a first image, wherein the first image comprises a first large coding unit (LCU) and a second LCU;
identifying a maximum transformation size associated with the first LCU;
performing a functional operation using: i) first information related to the maximum transform size and ii) second information related to a bit depth;
calculating a first maximum value based on the functional operation;
setting, for the first LCU and a second LCU, a first maximum offset to the first maximum value;
performing a sample adaptive offset (SAO) compensation on the first image by calculating a first offset value that is less than or equal to the first maximum offset;
performing, based on a second maximum transformation size, a second encoding operation on a second image; and
setting a second maximum offset corresponding to the second maximum transformation size,
wherein a first value of the first maximum offset and a second value of the second maximum offset are different.

11. The image processing method of claim 10, wherein the first image is corresponding to a first frame image and the second image is corresponding to a second frame image.

12. The image processing method of claim 11, wherein, when the first maximum transformation size is greater than the second maximum transformation size, the first maximum offset is less than the second maximum offset.

13. The image processing method of claim 10, wherein the first image is in a first region of a first frame, and the second image is in a second region of the first frame.

14. The image processing method of claim 10, wherein the first maximum transformation size is corresponding to a first maximum processing unit for performing a first transformation operation and a first quantization operation on the first image, and the second maximum transformation size is corresponding to a second maximum processing unit for performing a second transformation and quantization operation on the second image.

15. The image processing method of claim 10, wherein the performing of the sample adaptive offset (SAO) compensation comprises:
with respect to one or more coding units in the first image, classifying pixels of each of the one or more coding units into one or more SAO blocks;
allocating the first offset value less than or equal to the first maximum offset with respect to each of the one or more SAO blocks; and
adding up offset values allocated with respect to pixels in each of the one or more SAO blocks.

16. The image processing method of claim 10, further comprising performing SAO compensation on the second image by calculating a second offset value that is less than or equal to the second maximum offset,
wherein, when the second maximum transformation size is less than the first maximum transformation size, a second maximum value of the second offset value applied to the second image is greater than a first maximum value of the first offset value applied to the first image.

17. An image processing apparatus comprising:
at least one processor, wherein the at least one processor is configured to:
perform, based on a processing unit less than or equal to a maximum transformation size, a transformation operation and a quantization operation on an input image,
receive a reconstructed image generated via an inverse quantization process and an inverse transformation process with respect to the input image on which the transformation operation and the quantization operation has been performed, wherein the reconstructed image comprises a first largest coding unit (LCU) and a second LCU, and
perform sample adaptive offset (SAO) compensation on the reconstructed image by using a maximum offset for the first LCU and a second LCU, wherein the maximum offset is characterized by a value adjusted according to a change of the maximum transformation size.

18. The image processing apparatus of claim 17, wherein the at least one processor is further configured to generate a bitstream by performing entropy encoding on encoded image data and a sample adaptive offset (SAO) parameter.

19. The image processing apparatus of claim 17, wherein the at least one processor is further configured to output control information for adjusting the maximum transform size, and
wherein the at least one processor is further configured to adjust the maximum offset based on the control information.

* * * * *